(12) United States Patent
Kortum et al.

(10) Patent No.: US 8,036,348 B2
(45) Date of Patent: *Oct. 11, 2011

(54) SEQUENTIAL PRESENTATION OF LONG INSTRUCTIONS IN AN INTERACTIVE VOICE RESPONSE SYSTEM

(75) Inventors: Philip Ted Kortum, Austin, TX (US); Robert R. Bushey, Cedar Park, TX (US)

(73) Assignee: AT&T Labs, Inc., Austin, TX (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/251,153

(22) Filed: Oct. 14, 2008

(65) Prior Publication Data

US 2009/0034697 A1 Feb. 5, 2009

Related U.S. Application Data

(63) Continuation of application No. 11/876,525, filed on Oct. 22, 2007, now Pat. No. 7,453,994, which is a continuation of application No. 10/058,785, filed on Jan. 30, 2002, now Pat. No. 7,305,070.

(51) Int. Cl.
*H04M 11/06* (2006.01)
*H04L 12/66* (2006.01)

(52) U.S. Cl. ............. 379/88.18; 370/352; 370/356; 379/88.04; 379/208.01; 379/234; 379/265.02; 434/169; 455/414.1; 455/445; 455/564; 704/254; 725/110

(58) Field of Classification Search ............ 175/26; 370/352, 356; 379/88.18, 234, 265.02, 88.04; 455/414, 414.1, 445, 564; 707/3; 725/110; 434/169; 704/254

See application file for complete search history.

(56) References Cited

U.S. PATENT DOCUMENTS

| | | | |
|---|---|---|---|
| 4,310,727 A | 1/1982 | Lawser | |
| 4,694,483 A | 9/1987 | Cheung | |
| 4,761,542 A | 8/1988 | Kubo et al. | |
| 4,922,519 A | 5/1990 | Daudelin | |
| 4,930,077 A | 5/1990 | Fan | |
| 4,964,077 A | 10/1990 | Eisen et al. | |
| 5,115,501 A | 5/1992 | Kerr | |
| 5,147,205 A * | 9/1992 | Gross et al. | 434/169 |

(Continued)

FOREIGN PATENT DOCUMENTS

GB 01283969 5/2000

(Continued)

OTHER PUBLICATIONS

InterVoiceBrite, Inc., "AgentConnect Call Center Platform Brochure" (date not available).

(Continued)

*Primary Examiner* — Gerald Gauthier
(74) *Attorney, Agent, or Firm* — Greenblum & Bernstein, P.L.C.

(57) ABSTRACT

A method of presenting instructions to a user sending an incoming communication to a service center includes presenting a menu to the user. The menu includes a plurality of procedure descriptors to the user. The user is presented, according to a selection of one of the procedure descriptors by the user, a sequence of instructions which enable completion of a procedure described by the selected procedure descriptor. The incoming communication is transferred at a position in the sequence of instructions to a representative. The incoming communication is also transferred back to the same position in the sequence of instructions.

20 Claims, 15 Drawing Sheets

U.S. PATENT DOCUMENTS

| | | | |
|---|---|---|---|
| 5,181,259 A | 1/1993 | Rorvig | |
| 5,204,968 A | 4/1993 | Parthasarathi | |
| 5,206,903 A | 4/1993 | Kohler et al. | |
| 5,263,167 A | 11/1993 | Conner, Jr. et al. | |
| 5,299,260 A | 3/1994 | Shaio | |
| 5,311,422 A | 5/1994 | Loftin et al. | |
| 5,323,452 A | 6/1994 | Dickman et al. | |
| 5,327,529 A | 7/1994 | Fults et al. | |
| 5,329,578 A | 7/1994 | Brennan et al. | |
| 5,335,268 A | 8/1994 | Kelly, Jr. et al. | |
| 5,335,269 A | 8/1994 | Steinlicht | |
| 5,371,673 A | 12/1994 | Fan | |
| 5,384,831 A | 1/1995 | Creswell et al. | |
| 5,388,198 A | 2/1995 | Layman et al. | |
| 5,420,975 A | 5/1995 | Blades et al. | |
| 5,479,488 A | 12/1995 | Lennig et al. | |
| 5,493,608 A | 2/1996 | O'Sullivan | |
| 5,495,567 A | 2/1996 | Iizawa et al. | |
| 5,500,795 A | 3/1996 | Powers et al. | |
| 5,519,772 A | 5/1996 | Akman et al. | |
| 5,530,744 A | 6/1996 | Charalambous et al. | |
| 5,533,107 A | 7/1996 | Irwin et al. | |
| 5,535,321 A | 7/1996 | Massaro et al. | |
| 5,537,470 A | 7/1996 | Lee | |
| 5,553,119 A | 9/1996 | McAllister et al. | |
| 5,561,711 A | 10/1996 | Muller | |
| 5,566,291 A | 10/1996 | Boulton et al. | |
| 5,586,060 A | 12/1996 | Kuno et al. | |
| 5,586,171 A | 12/1996 | McAllister et al. | |
| 5,586,219 A | 12/1996 | Yufik | |
| 5,594,791 A | 1/1997 | Szlam et al. | |
| 5,600,781 A | 2/1997 | Root et al. | |
| 5,615,323 A | 3/1997 | Engel et al. | |
| 5,633,909 A | 5/1997 | Fitch | |
| 5,657,383 A | 8/1997 | Gerber et al. | |
| 5,659,724 A | 8/1997 | Borgida et al. | |
| 5,666,400 A | 9/1997 | McAllister et al. | |
| 5,668,856 A | 9/1997 | Nishimatsu et al. | |
| 5,671,351 A | 9/1997 | Wild et al. | |
| 5,675,707 A | 10/1997 | Gorin et al. | |
| 5,684,870 A | 11/1997 | Maloney et al. | |
| 5,684,872 A | 11/1997 | Flockhart et al. | |
| 5,706,334 A | 1/1998 | Balk et al. | |
| 5,710,884 A | 1/1998 | Dedrick | |
| 5,727,950 A | 3/1998 | Cook et al. | |
| 5,729,600 A | 3/1998 | Blaha et al. | |
| 5,734,709 A | 3/1998 | DeWitt et al. | |
| 5,740,549 A | 4/1998 | Reilly et al. | |
| 5,757,644 A | 5/1998 | Jorgensen et al. | |
| 5,758,257 A | 5/1998 | Herz et al. | |
| 5,771,276 A | 6/1998 | Wolf | |
| 5,790,117 A | 8/1998 | Halviatti et al. | |
| 5,793,368 A | 8/1998 | Beer | |
| 5,802,526 A | 9/1998 | Fawcett et al. | |
| 5,806,060 A | 9/1998 | Borgida et al. | |
| 5,808,908 A | 9/1998 | Ghahramani | |
| 5,809,282 A | 9/1998 | Cooper et al. | |
| 5,812,975 A | 9/1998 | Komori et al. | |
| 5,819,221 A | 10/1998 | Kondo et al. | |
| 5,821,936 A | 10/1998 | Shaffer et al. | |
| 5,822,397 A | 10/1998 | Newman | |
| 5,822,744 A | 10/1998 | Kesel | |
| 5,825,856 A | 10/1998 | Porter et al. | |
| 5,825,869 A | 10/1998 | Brooks et al. | |
| 5,832,428 A | 11/1998 | Chow et al. | |
| 5,832,430 A | 11/1998 | Lleida et al. | |
| 5,835,565 A | 11/1998 | Smith et al. | |
| 5,848,396 A | 12/1998 | Gerace | |
| 5,864,605 A | 1/1999 | Keshav | |
| 5,864,844 A | 1/1999 | James et al. | |
| 5,870,308 A | 2/1999 | Dangelo et al. | |
| 5,872,865 A | 2/1999 | Normile et al. | |
| 5,873,068 A | 2/1999 | Beaumont et al. | |
| 5,875,108 A | 2/1999 | Hoffberg et al. | |
| 5,884,029 A | 3/1999 | Brush, II et al. | |
| 5,884,262 A | 3/1999 | Wise et al. | |
| 5,899,992 A | 5/1999 | Iyer et al. | |
| 5,903,641 A | 5/1999 | Tonisson | |
| 5,905,774 A | 5/1999 | Tatchell et al. | |
| 5,920,477 A | 7/1999 | Hoffberg et al. | |
| 5,923,745 A | 7/1999 | Hurd | |
| 5,943,416 A | 8/1999 | Gisby | |
| 5,953,406 A | 9/1999 | LaRue et al. | |
| 5,963,965 A | 10/1999 | Vogel | |
| 5,974,253 A | 10/1999 | Nahaboo et al. | |
| 5,991,735 A | 11/1999 | Gerace | |
| 5,999,611 A | 12/1999 | Tatchell et al. | |
| 5,999,908 A | 12/1999 | Abelow | |
| 6,014,638 A | 1/2000 | Burge et al. | |
| 6,016,336 A | 1/2000 | Hanson | |
| 6,026,381 A | 2/2000 | Barton, III et al. | |
| 6,032,129 A | 2/2000 | Greef et al. | |
| 6,035,283 A | 3/2000 | Rofrano | |
| 6,035,336 A | 3/2000 | Lu et al. | |
| 6,038,560 A | 3/2000 | Wical | |
| 6,044,355 A | 3/2000 | Crockett et al. | |
| 6,052,693 A | 4/2000 | Smith et al. | |
| 6,055,542 A | 4/2000 | Nielsen et al. | |
| 6,058,163 A | 5/2000 | Pattison et al. | |
| 6,058,179 A | 5/2000 | Shaffer et al. | |
| 6,058,435 A | 5/2000 | Sassin et al. | |
| 6,061,433 A | 5/2000 | Polcyn et al. | |
| 6,067,538 A | 5/2000 | Zorba et al. | |
| 6,088,429 A | 7/2000 | Garcia | |
| 6,099,320 A | 8/2000 | Papadopoulos | |
| 6,104,790 A | 8/2000 | Narayanaswami | |
| 6,128,380 A | 10/2000 | Shaffer et al. | |
| 6,128,624 A | 10/2000 | Papierniak et al. | |
| 6,134,315 A | 10/2000 | Galvin | |
| 6,134,530 A | 10/2000 | Bunting et al. | |
| 6,148,063 A | 11/2000 | Brennan et al. | |
| 6,157,808 A | 12/2000 | Hollingsworth | |
| 6,160,877 A | 12/2000 | Tatchell et al. | |
| 6,161,130 A | 12/2000 | Horvitz et al. | |
| 6,163,607 A | 12/2000 | Bogart et al. | |
| 6,166,732 A | 12/2000 | Mitchell et al. | |
| 6,170,011 B1 | 1/2001 | Macleod Beck et al. | |
| 6,173,053 B1 | 1/2001 | Bogart et al. | |
| 6,173,279 B1 | 1/2001 | Levin et al. | |
| 6,201,948 B1 | 3/2001 | Cook et al. | |
| 6,208,970 B1 | 3/2001 | Ramanan | |
| 6,212,502 B1 | 4/2001 | Ball et al. | |
| 6,219,665 B1 | 4/2001 | Shiomi | |
| 6,230,197 B1 | 5/2001 | Beck et al. | |
| 6,236,395 B1 | 5/2001 | Sezan et al. | |
| 6,236,955 B1 | 5/2001 | Summers | |
| 6,236,990 B1 | 5/2001 | Geller et al. | |
| 6,243,375 B1 | 6/2001 | Speicher | |
| 6,249,579 B1 | 6/2001 | Bushnell | |
| 6,263,051 B1 | 7/2001 | Saylor et al. | |
| 6,263,052 B1 | 7/2001 | Cruze | |
| 6,269,153 B1 | 7/2001 | Carpenter et al. | |
| 6,278,976 B1 | 8/2001 | Kochian | |
| 6,282,404 B1 | 8/2001 | Linton | |
| 6,289,084 B1 | 9/2001 | Bushnell | |
| 6,292,909 B1 | 9/2001 | Hare | |
| 6,295,551 B1 | 9/2001 | Roberts et al. | |
| 6,296,376 B1 | 10/2001 | Kondo et al. | |
| 6,308,172 B1 | 10/2001 | Agrawal et al. | |
| 6,330,326 B1 | 12/2001 | Whitt | |
| 6,332,154 B2 | 12/2001 | Beck et al. | |
| 6,336,109 B2 | 1/2002 | Howard | |
| 6,338,050 B1 | 1/2002 | Conklin et al. | |
| 6,349,290 B1 | 2/2002 | Horowitz et al. | |
| 6,349,410 B1 * | 2/2002 | Lortz | 725/110 |
| 6,353,661 B1 | 3/2002 | Bailey, III | |
| 6,353,825 B1 | 3/2002 | Ponte | |
| 6,357,017 B1 | 3/2002 | Bereiter et al. | |
| 6,366,879 B1 | 4/2002 | Coxhead et al. | |
| 6,373,817 B1 | 4/2002 | Kung et al. | |
| 6,374,260 B1 | 4/2002 | Hoffert et al. | |
| 6,381,640 B1 | 4/2002 | Beck et al. | |
| 6,389,400 B1 | 5/2002 | Bushey et al. | |
| 6,389,403 B1 | 5/2002 | Dorak, Jr. | |
| 6,389,538 B1 | 5/2002 | Gruse et al. | |
| 6,400,807 B1 | 6/2002 | Hewitt et al. | |
| 6,405,149 B1 | 6/2002 | Tsai et al. | |

| | | | |
|---|---|---|---|
| 6,405,159 B2 | 6/2002 | Bushey et al. | |
| 6,405,170 B1 | 6/2002 | Phillips et al. | |
| 6,411,687 B1 | 6/2002 | Bohacek et al. | |
| 6,418,216 B1 | 7/2002 | Harrison et al. | |
| 6,434,714 B1 | 8/2002 | Lewis et al. | |
| 6,448,980 B1 | 9/2002 | Kumar et al. | |
| 6,456,619 B1 | 9/2002 | Sassin et al. | |
| 6,456,699 B1 | 9/2002 | Burg et al. | |
| 6,459,912 B1 | 10/2002 | Moeller et al. | |
| 6,483,523 B1 | 11/2002 | Feng | |
| 6,487,277 B2 | 11/2002 | Beyda et al. | |
| 6,510,411 B1 | 1/2003 | Norton et al. | |
| 6,516,051 B2 | 2/2003 | Sanders | |
| 6,539,080 B1 | 3/2003 | Bruce et al. | |
| 6,564,197 B2 | 5/2003 | Sahami et al. | |
| 6,587,127 B1 | 7/2003 | Leeke et al. | |
| 6,598,022 B2 | 7/2003 | Yuschik | |
| 6,600,821 B1 | 7/2003 | Chan et al. | |
| 6,618,715 B1 | 9/2003 | Johnson et al. | |
| 6,624,803 B1 | 9/2003 | Vanderheiden et al. | |
| 6,651,755 B1 * | 11/2003 | Kelpe | 175/26 |
| 6,654,447 B1 | 11/2003 | Dewan | |
| 6,658,389 B1 | 12/2003 | Alpdemir | |
| 6,728,685 B1 | 4/2004 | Ahluwalia | |
| 6,741,967 B1 | 5/2004 | Wu et al. | |
| 6,778,643 B1 | 8/2004 | Bushey et al. | |
| 6,778,651 B1 | 8/2004 | Jost et al. | |
| RE38,649 E | 11/2004 | Setlur et al. | |
| 6,826,173 B1 | 11/2004 | Kung et al. | |
| 6,970,551 B2 * | 11/2005 | Costrell et al. | 379/234 |
| 6,980,963 B1 | 12/2005 | Hanzek | |
| 7,006,487 B1 * | 2/2006 | Ma et al. | 370/352 |
| 7,085,257 B1 | 8/2006 | Karves et al. | |
| 7,305,070 B2 * | 12/2007 | Kortum et al. | 379/88.18 |
| 7,453,994 B2 * | 11/2008 | Kortum et al. | 379/88.18 |
| 2001/0014863 A1 | 8/2001 | Williams, III | |
| 2001/0014868 A1 | 8/2001 | Herz et al. | |
| 2001/0041562 A1 | 11/2001 | Elsey et al. | |
| 2002/0055868 A1 | 5/2002 | Dusevic et al. | |
| 2002/0133394 A1 | 9/2002 | Bushey et al. | |
| 2002/0196277 A1 | 12/2002 | Bushey et al. | |
| 2003/0026409 A1 | 2/2003 | Bushey et al. | |
| 2003/0033294 A1 * | 2/2003 | Walker et al. | 707/3 |
| 2003/0055974 A1 | 3/2003 | Brophy et al. | |
| 2003/0143981 A1 * | 7/2003 | Kortum et al. | 455/414 |
| 2003/0156133 A1 | 8/2003 | Martin et al. | |
| 2003/0156706 A1 | 8/2003 | Koehler et al. | |
| 2003/0158655 A1 | 8/2003 | Obradovich et al. | |
| 2003/0161464 A1 | 8/2003 | Rodriguez et al. | |
| 2004/0006473 A1 | 1/2004 | Mills et al. | |
| 2004/0032935 A1 | 2/2004 | Mills et al. | |
| 2004/0042592 A1 | 3/2004 | Knott et al. | |
| 2004/0062371 A1 | 4/2004 | Maropis et al. | |
| 2004/0077347 A1 | 4/2004 | Lauber et al. | |
| 2004/0090950 A1 | 5/2004 | Lauber et al. | |
| 2004/0179659 A1 * | 9/2004 | Byrne et al. | 379/88.18 |
| 2004/0240635 A1 | 12/2004 | Bushey et al. | |
| 2005/0163304 A1 * | 7/2005 | Judkins et al. | 379/265.02 |
| 2005/0232250 A1 * | 10/2005 | Craig et al. | 370/352 |
| 2008/0089491 A1 * | 4/2008 | Kortum et al. | 379/88.18 |
| 2009/0034697 A1 * | 2/2009 | Kortum et al. | 379/88.18 |

FOREIGN PATENT DOCUMENTS

| | | |
|---|---|---|
| WO | 99/06929 | 2/1999 |
| WO | 00/33548 | 6/2000 |
| WO | 00/73968 | 2/2003 |
| WO | 03/013111 | 2/2003 |

OTHER PUBLICATIONS

ACD Learning Center Tutorial Series, ACD Call Center Online Learning Center, retrieved from the Internet at call-center.net/ivr-series htm (1998-1999).
Products & Services-Interactive Voice Response (IVR), Prairie Systems, retrieved from the Internet at prairiesys.com/PSI/p_s_interactive_sol. htm (2005).
"RVS Voice," iMessaging system, Inc., retrieved from the Internet at imessagingsystems.com/imsprods/rvsvoice/rvsvoice (date not available).
Foster, Advanced Definity Call Centers: Working for You and Your Customers, AT&T Technology, v9, n2, from DIALOG File 15: ABI/Inform (Summary 94).
Shingledecker, Operator Strategy: A Neglected Variable in Workload Assessment. The American Psychological Association, Division 21 Symposium on Mental Workload Measurement: The Theory Application Interface, Montreal Quebec, Canada: American Psychological Association (1980).
Card et al., The Psychology of Human-Computer Interaction. Hillsdale, NJ: Lawrence Erlbaum (1983).
Stanfill et al., Toward Memory-Based Reasoning, Communications of the ACM, vol. 29, No. 12, (Dec. 1986).
Hart et al., Development of the NASA-TLX (Task Load Index): Results of Empirical and Theoretical Research. In P.A. Hancock and N. Meshkati (Eds.), Human Mental Workload. (pp. 139-183) Amsterdam: North-Holland (1988).
Maes, Behavior-Based Artificial Intelligence, MIT Media-Laboratory, From Animals to Animal 2, Proceedings of the Second International Conference on Simulation of Adaptive Behavior (1992).
Maybury, Intelligent Multi-Media Interfaces, AAAI/MIT Press, Cambridge, MA, Chapter 5: S.K. Fiener et al., Automating the Generation of Coordinated Multimedia Explanations (1993).
Wierwille et al., Recommendations for Mental Workload Measurement in a Test and Evaluation Environment, Human Factors, 35 (2), pp. 263-281(1993).
Orwant, Doppelganger Goes to School: Machine Learning for User Modeling, MIT MS Thesis, (Sep. 1993).
Shardanand, Social Information Filtering for Music Recommendation, MIT MS Thesis (1994).
Murtaugh, The Automatist Storytelling System, Massachusetts Institute of Technology, Masters Thesis (1996).
Brooks, Do Story Agents Use Rocking Chairs?, The Theory and Implementation of One Model for Computational Narrative, Proceedings of the Fourth ACM International Multimedia Conference on Intelligent User Interfaces, ACM Press (1996).
Szekely, Retrospective and Challenges for Model-Based Interface Development, USC Information Sciences Institute, Marina del Ray, CA (1996).
Orwant, for Want of a Bit the User was Lost: Cheap User Modeling, IBM Systems Journal, vol. 35, Nos. 3 & 4, pp. 398-416 (1996).
John et al., Using GOMS for User Interface Design and Evaluation: Which technique? ACM Transactions on Computer-Human Interaction, 3 (4). 287-319 (1996).
INSPEC abstract of A Spoken Language System for Automated Call Routing, published IEEE International Conference on Acoustics, Speech, and Signal Processing by G. Riccardi et al., AT&T Bell Labs (1997).
Sgouros et al., Dynamic Dramatization of Multimedia Story Presentations, ACM, pp. 87-94 (1997).
Wei, *Mental Load and Performance at Different Automation Levels*. The Netherlands: Delft University, 28-38 (1997).
Vuori et al., chapter 12. Developing of Future User Interfaces. Smart Machines and Systems 2010 Technology Programme 1997-2000.
Call Centers: Sales, Service and Competitive Advantage, Canadian Business, v70, n2, from DIALOG File 148: Gale Group Trade & Industry DB (Feb. 1997).
Cortes, Designing Graphical User Interface.[online] Clinical Information Engines, accepted for publication in Medical Computing Today, [retrieved Aug. 2005]. Retrieved from the Internet at medicalcomputingtoday.com/Oagui (May 1997).
Chauncey, Designing for Usability. Don't Forget the Power the User. Usability Interface [retrieved Aug. 2005]. Retrieved from the Internet at stcsig.org/usability/newsletter/9710-power-user (Oct. 1997).
Kellner et al., PADIS—An Automatic Telephone Switchboard and Directory Information System, Speech Communication (Oct. 1997).
Lucent Technologies Announces Trial of Natural Language Call-Routing Technology for USAA—press release (Dec. 1997).
Carpenter et al., Natural Language Call Routing: A Robust, Self-Organising Approach, Lucent Technologies Bell Laboratories (1998).
Kellner et al., A Voice-Controlled Automatic Telephone Switchboard and Directory Information System, Philips GmbH Forschungslaboratorien, pp. 117-120 (1998).

Hanrieder, Gerhard Integration of a Mixed-Initiative Dialogue Manager Into Commercial IVR Platforms, Daimler-Benz Aerospace AG, pp. 77-82 (1998).
Kobayashi et al., Information Presentation based on Individual User Interests, Second International Conference on Knowledge-Based Intelligent Electronic Systems, 21-23 IEEE pp. 375-383 (Apr. 1998).
Ameritech Corp., Ameritech Phone-Based UI Standards: Dialogue Design, retrieved from the Internet at ameritech.com/corporate/testtown/library/standard/pbix4 (1998).
Chu-Carroll et al., Vector-based Natural Language Call Routing, Association for Computation Linguistics, pp. 361-388 (1999).
Lieberman et al., Let's Browse: A Collaborative Web Browsing Agent, Proceedings of IUI 99, CPP Conference Paper (Jan. 1999).
Kelly, From Intelligent Call Routing to Intelligent Contact Management, Call Center Solutions, v19, n3, from DIALOG File 15: ABI/Inform (Sep. 2000).
What's Next in Interactive Voice Response, International Nortel Networks Meridian Users Group, retrieved from the Internet at innmug.org/Information/kirvan, Inn Touch (Dec. 2000).
Customer Management Technology, TeleTech, retrieved from the Internet at teletech.com/solutions/cmt [printed Dec. 2001].
Foster, "Advanced Definity call centers: Working for you and your customers," AT&T Technology, v9, n2, 7 pages from DIALOG File 15: ABI/Inform (Summer 94).
Abrams et al., "UIML: An Appliance-Independent XML User Interface Language" Proceedings of the International Conference on World Wide Web, pp. 1-14, pp. 1-14, XP002163485, (May 1999).

Call Center Roundup (Buyers Guide), Teleconnect, Dec. 1998, 10 pages from DIALOG File 275: Gale Group Computer DB.
Meggers et al., "A multimedia communication architecture for handled devices," Personal Indoor and Mobile Radio Communications, IEEE, pp. 3 double-sided, (Sep. 1998).
Bergzen, "Project Status and System Architecture of an Automated HF System to be Used by the Swedish Armed Forces," IEEE Military Communications Conference, pp. 4 double sided, (Oct. 2001).
Henderson et al., "A Taxonomy of Network Transcoding", Proceedings of the SPIE, vol. 3969, pp. 65-72, XP008007261, ISSN: 0277-786X, (Jan. 2000).
Fox et al., "Adapting to Network and Client Variability Via On-Demand Dynamic Distillation", ACM Sigplan Notices, Association for Computing Machinery, vol. 31, No. 9, pp. 160-170, XP000639230, ISSN: 0362-1340, (Sep. 1996).
Mohan et al., "Content Adaptation Framework: Bringing the Internet to Information Appliances", 1999 IEEE Global Telecommunications Conferences Globecom 1999, Seamless Interconnection for Universal services, vol. 4, pp. 2015-2021, XP000951336, ISBN:0/7803-5797-3, (Dec. 1999).
"CC/PP Attribute Vocabularies" W3C Jul. 21, 2000, XP002218349, Abrams, M., et al., "UIML: An Appliance-Independent XML User Interface Language" Proceedings of the International Conference on World Wide Web, pp. 1-14, XP002163485, (May 1999).

* cited by examiner

SEQUENTIAL PRESENTATION OF LONG INSTRUCTIONS IN AN INTERACTIVE VOICE RESPONSE SYSTEM

CROSS-REFERENCE TO RELATED APPLICATION

This application is a continuation application of pending U.S. patent application Ser. No. 11/876,525, which was filed on Oct. 22, 2007, which is a continuation application of U.S. patent application Ser. No. 10/058,785, which was filed on Jan. 30, 2002, now U.S. Pat. No. 7,305,070, the contents of which are expressly incorporated by reference herein in their entireties.

BACKGROUND OF THE INVENTION

1. Field of the Invention

The present invention relates to the field of telecommunications. More particularly, the present invention relates to an interactive voice response (IVR) system for managing customer calls.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

Dual Tone Multi Frequency (DTMF)
Interactive Voice Response (IVR)

3. Description of Background Information

Many companies utilize IVR call management systems in order to handle and route incoming telephone calls. This is especially true for calls not requiring a live operator to assist the caller. UVR systems have been phenomenally successful and enjoy widespread use because they generate enormous cost savings at customer call centers, due to a reduction in required staff.

Conventional IVR systems are well-suited to providing small amounts of information to a user in real-time. However, conventional UVR systems have shortcomings, particularly with respect to larger amounts of information or instruction sets longer than one or two sentences. The primary reason for this shortcoming is the short-term memory and cognitive limitations inherent in the average caller. That is, most callers are not well adapted to remembering long strings of information (e.g., a long sequential recitation of tasks) presented in a short period of time, especially when sequence-specific procedures are presented. Further, conventional IVR systems require the caller to remember various navigational control keys, i.e., forward, backward, repeat, continue, etc. Moreover, conventional IVR systems lack the ability and flexibility to present long, detailed sequential instructions sets to a caller in a manner suitable to the average caller's cognitive capabilities. Further, conventional IVR systems also assume that the caller has performed a particular step correctly. Successive steps may be impossible to perform when a previous step has been performed incorrectly. This approach may lead to customer frustration and dissatisfaction.

As a result, it would be desirable to have a IWR system that would allow a caller to perform a series of sequential tasks, based on an instruction set, at the caller's own pace.

The present invention overcomes the problems associated with the prior art.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which.

DETAILED DESCRIPTION OF THE EMBODIMENTS

Figure 1:
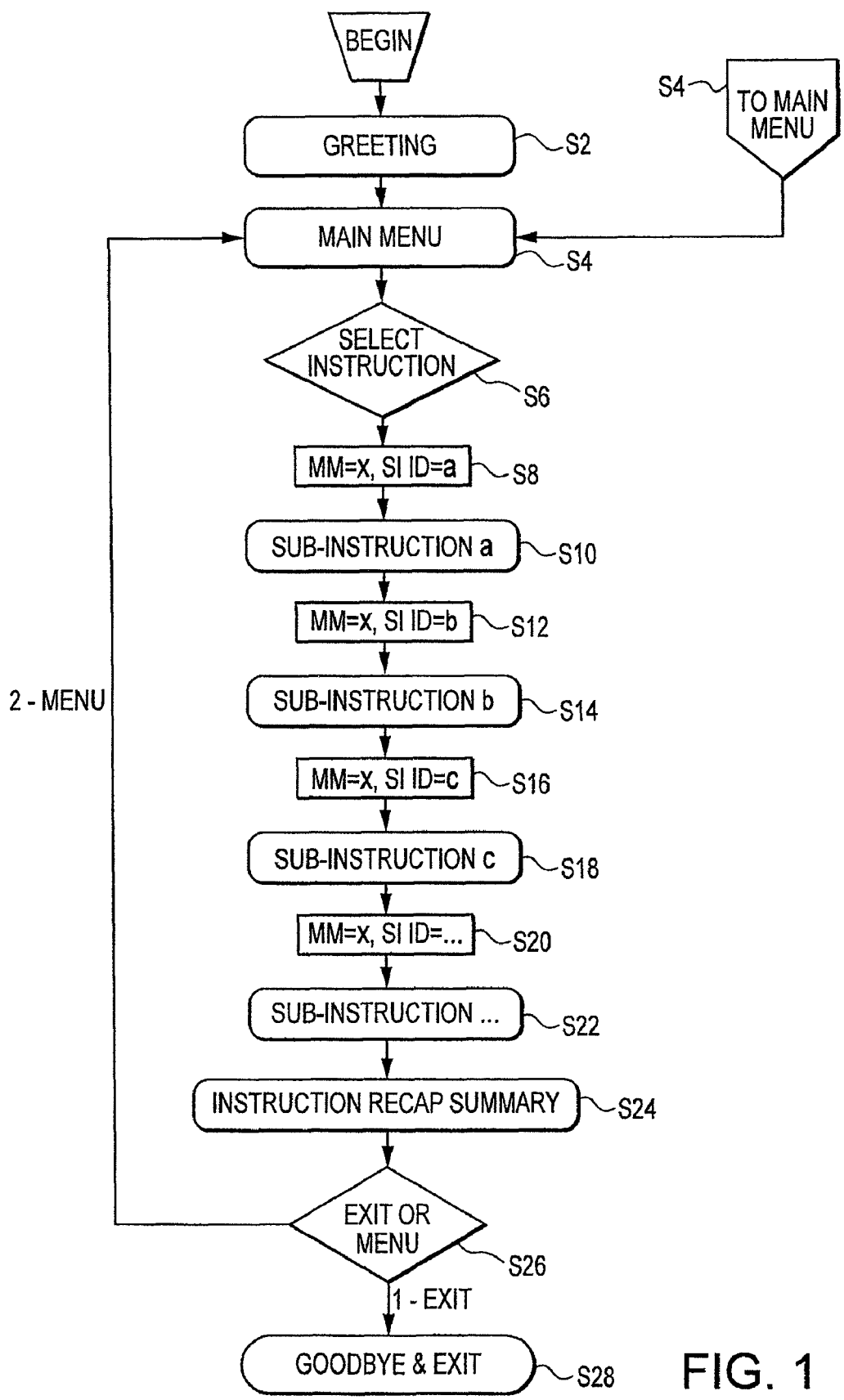
FIG. 1 is an exemplary flowchart diagram of IVR call processing, according to an aspect of the present invention.

In view of the foregoing, the present invention, through one or more of its various aspects and/or embodiments is thus presented to provide an interactive voice response (VR) system for managing customer calls.

Accordingly, one aspect of the present invention is to provide a method for sequentially presenting instructions in a telephone call placed to an IVR system of a customer service center. The method includes receiving a call from a caller, presenting a main menu to the caller that includes multiple messages in which each message represents a procedure, and prompting the caller to select from one of the main menu messages. The method further includes presenting a sequence of instructions to the caller according to the caller's main menu selection, in which each instruction identifies a task to be performed by the caller that is distinct from interaction with the IVR system and wherein the tasks collectively constitute the procedure, The sequence of instructions are automatically paused after each instruction for a predetermined amount of time so as to permit the caller to perform the task identified in an instruction. Then, the caller is queried after each instruction as to whether the caller has performed the task identified in the instruction.

The method may further include periodically re-presenting the instruction to the caller until the caller indicates that the caller has performed the task identified in the instruction. Also, the method may include transferring the caller to a service representative after the instruction has been re-presented to the caller for a predetermined number of times. The sequence of instructions may be paused at the caller's request.

A summary of the sequence of the instructions may be presented to the caller immediately after the caller's selection, after the sequence of instructions has been presented to the caller, or immediately after the caller's selection and after the sequence of instructions has been presented to the caller.

The method may include presenting a previously presented instruction to the caller in response to a caller's indication that the caller has not performed the task identified in the previously presented instruction. Further, additional information associated with the instruction may be presented to the caller upon the caller's request, which is followed by a recommencement of the sequence of instructions.

The method may include querying the caller after the caller indicates that the caller has performed a task identified in the instruction as to whether the task identified in the instruction was performed correctly. The instruction may be re-presented to the caller in response to the caller's indication that the task identified in the instruction was not performed correctly. Further the caller may be queried as to whether the procedure was performed correctly. The sequence of instructions may be re-presented to the caller in response to the caller's indication that the procedure was not performed correctly.

The method may also include transferring the call from a position in the sequence of instructions to a service representative and transferring the call back to the position in the sequence of instructions. Alternatively, the method may include transferring the call from a position in the sequence of instructions to a service representative and transferring the call back to a location in the sequence of instructions other than the position.

Further, the method may include re-presenting apreviously presented instruction to the caller in response to the caller's request receive a previously presented instruction. Also, the method may include re-presenting a previously presented instruction to the caller, as requested by the caller during a recitation of previously presented instructions. The method may further include presenting the caller with troubleshooting information in response to the caller's request for troubleshooting information.

Accordingly, another aspect of the present invention is to provide a system for receiving telephone calls at a customer service center. The system includes an IVR unit that presents a main menu of messages to a caller, presents a sequence of instructions to the caller and automatically pauses the sequence of instructions after each instruction by a predetermined amount of time so as to permit the caller to perform a task identified in an instruction that is distinct from interaction with the IVR. The IVR unit queries the caller after each instruction as to whether the caller has performed the task identified in the instruction. Each main menu message represents a procedure and each instruction identifies a task to be performed by the caller.

The system may include a component that transfers a call from a position in the sequence of instructions to a service representative and transfers the call back to the position in the sequence of instructions. Further, the system may include a component that transfers a call from a position in the sequence of instructions to a service representative and transfers the call back to a location in the sequence of instructions other than the position.

Accordingly, another aspect of the present invention is to provide a computer readable medium for storing a computer program that processes a telephone call in an IVR system. A presenting source code segment is provided that presents a main menu of messages to a caller and presents a sequence of instructions to the caller in which each instruction identifies a task distinct from interaction with the IVR system. A pausing source code segment is provided that pauses the sequence of instructions after each instruction for a predetermined amount of time so as to permit the caller to perform a task identified in an instruction A querying source code segment is also provided that queries the caller after each instruction as to whether the caller performed the task identified in the instruction.

The presenting source code segment may periodically re-present the instruction to the caller until the caller indicates that the caller has performed the task identified in the instruction. Also, a transferring source code segment may be provided that transfers the call to a service representative after the instruction has been re-presented to the caller for a predetermined number of times. Further, the pausing source code segment may pause the sequence of instructions in response to the caller's command to do so.

The presenting source code segment may present a summary of the sequence of the instructions to the caller immediately after the caller's selection, after the sequence of instructions has been presented to the caller, or immediately after the caller's selection and after the sequence of instructions has been presented to the caller.

Further, the presenting source code segment may present a previously presented instruction to a caller in response to a caller's indication that the caller has not performed the task identified in the previously presented instruction. Also, the presenting source code segment may present additional information associated with the instruction in response to the caller's request for additional information, followed by a recommencement of the sequence of instructions.

The querying source code segment may query the caller, after the caller indicates that the caller has performed the task identified in the instruction, as to whether the task identified in the instruction was performed correctly. Further, the presenting source code segment may re-present the instruction to the caller in response to the caller's indication that the task identified in the instruction was not performed correctly. Also, the querying source code segment may query the caller as to whether the procedure was performed correctly. Further, the presenting source code segment may represent the sequence of instructions to the caller in response to the caller's indication that the procedure was not performed correctly.

Further, a transferring source code segment may be provided that transfers the call from a position in the sequence of instructions to a service representative and transfers the call back to the position in the sequence of instructions. Alternatively, a transferring source code segment may be provided that transfers the call from a position in the sequence of instructions to a service representative and transfers the call back to a location in the sequence of instructions other than the position.

Still further, the presenting source code segment may re-present an instruction to the caller in response to the caller's command to receive a previously presented instruction. Also, the presenting source code segment may re-present a previously presented instruction to the caller, as requested by the caller during a recitation of previously presented instructions.

The present invention relates to an IVR system that allows a caller to receive a sequence of instructions and perform the instructed steps at the callers own pace. Customers often have difficulties when performing complex tasks, e.g., installing computer hardware and/or software. Some of the difficulties arise from inexperience on the part of the customer. Other times, the problems are associated with the customer's equipment. In any event, customers may require detailed, sequential instructions in order to performing various procedures. This is especially true with respect to computer and telecommunications applications. Unfortunately, instructions in these disciplines tend to be long. Moreover, customers will undoubtedly have questions and make mistakes. As a result, a certain amount of hand-holding is necessary, while not frustrating experienced customers or creating excessively long IVR calls.

In one embodiment, the IVR system employs, as a non-limiting example, the Nortel Networks Periphonics Voice Processing Series Information Server VPS/is 2 model. The IVR call management system may use Periphonics Operating System 5.3-1 (or higher version) running on a Sparc workstation available from Sun Microsystems, Inc. The Sparc workstation may be equipped, for example, with Sun Operating System 5.6 (or higher version). Other systems can also be equipped without deviating from the scope and spirit of the present invention.

FIG. 1 is an exemplary flowchart diagram of UVR call processing, according to an aspect of the present invention. At step s2 a call is received and a greeting is presented or played to the caller. At step s4, a main menu is played to the caller, requesting that the caller select from a plurality of choices, e.g., various procedures, one of which the caller wishes to undertake. The number and type of choices that may be used in the main menu is virtually unlimited; however, for the sake of illustration, the caller may be presented with the following three representative menu messages in the main menu: For x procedure, select 1; For y procedure, select 2; For z procedure, select 3. At step s6, the caller makes a selection from the main menu, selecting either 1, 2, or 3 representing procedures x, y, or z, respectively. After the caller makes a selection from the main menu, an overall summary of instructions may immediately be provided that allows the user to determine if they are receiving the correct instructions. Further, it assists the user in determining if they wish to proceed with the current instructions. A decision step (not shown) may be provided that would allow the caller to return to the main menu at step s4 or exit the system and disconnect the call.

Next, the caller is presented with an instruction set comprising a series of sub-instructions (i.e., tasks), e.g., represented by a, b, c, d, e, . . . . If procedure x is chosen by the caller, main menu variable "MM" is set to x (i.e., MM=x) and sub-instruction Identification "SI ID" is set to "a" (i.e., SI ID=a), at step s8. The variables MM and SI ID are used by the IVR system to determine which messages to present to the caller. At step s10, sub-instruction "a" is played to the caller. At step s12, MM=x and SI ID=b. Thus, at step s14 sub-instruction "b" is played to the caller. At step s16, MM=x and SI ID=c. As a result, at step s18 sub-instruction "c" is played to the caller. At step s20, MM=x and SI ID=d. Accordingly, at step s22 sub-instruction "d" is played to the caller. Recitation of the sub-instructions proceeds in this fashion until all of the sub-instructions have been presented.

After all of the sub-instructions have been presented and successfully performed, the caller can elect to receive a summary of all of the steps, in order to ensure that all of the steps have been completed. If the user is uncertain about successful completion of any or all of the steps recited in the summary, they would be provided an opportunity to return to any point in the instruction set. Thus, the caller may receive a summary of the instructions before and/or after performing the steps. In FIG. 1, the caller has elected to receive an instruction recap summary. At step s24, an instruction recap is played to the caller. At step s26, the caller may elect to exit the system at step s28 by selecting "1", or return to the main menu at step s4 by selecting "2".

Figure 2:
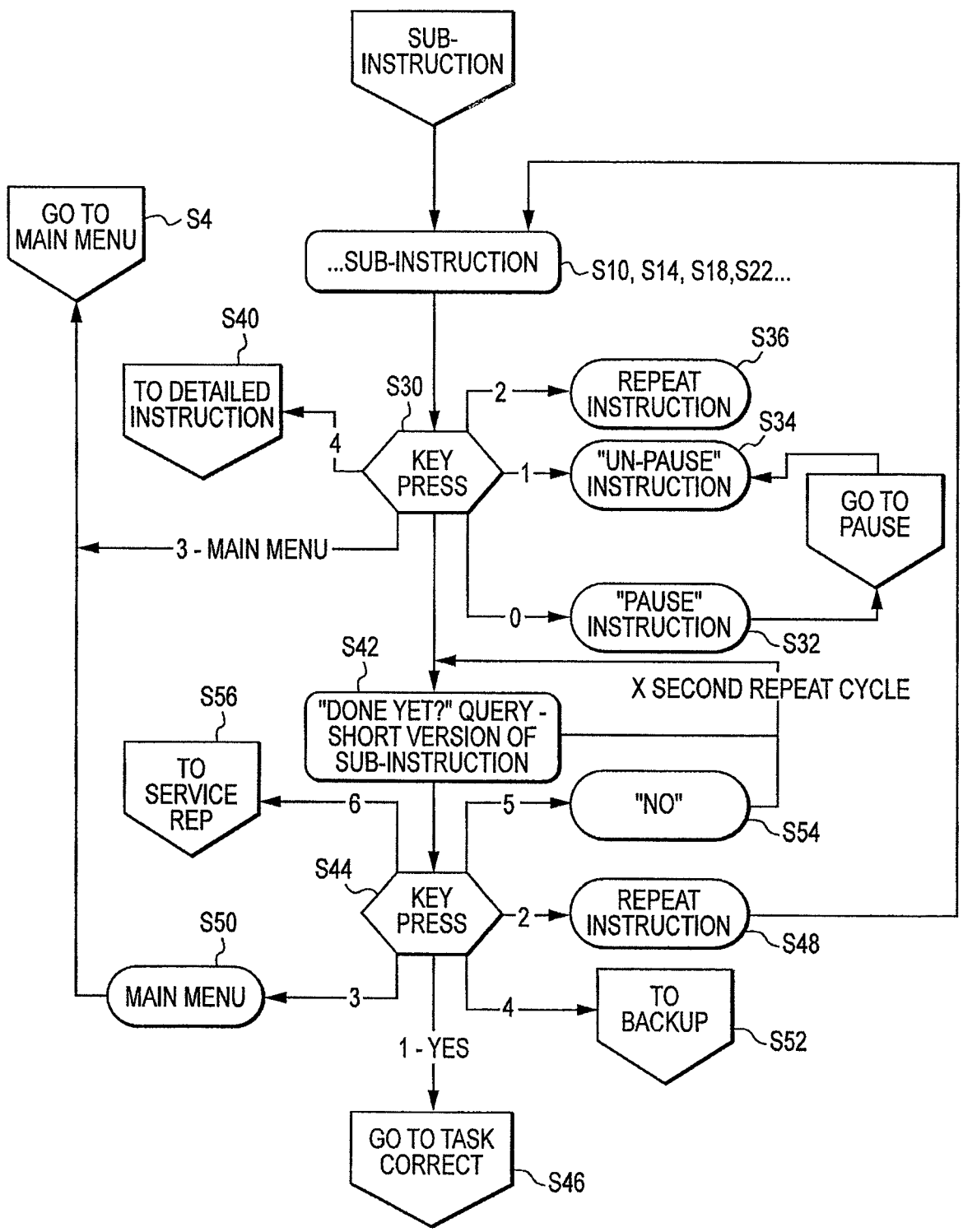
FIG. 2 is an exemplary flowchart diagram of sub-instruction call processing, according to an aspect of the present invention.

FIG. 2 is an exemplary flowchart diagram of sub-instruction call processing. Continuing the flow of FIG. 1, a sub-instruction is presented to the caller at steps s1, s14, s18, s22. Each sub-instruction provides only a small amount of information at a time to callers. That is, the amount of information presented does not exceed the caller's memory and cognitive abilities. In addition, the system automatically pauses after each instruction is provided, in order to allow the caller time to perform the recited task, e.g., reboot the computer.

After the sub-instruction is presented to the caller, the caller may input a dual tone multi frequency (DTMF) command, by pressing a key, at step s30 for various options, based upon prompting by the system. The prompting may be provided prior to any sub-instructions are presented, especially if the sub-instructions are relatively short. Alternatively, the prompting may be included at the end of each sub-instruction. In any event, exemplary prompting may advise the caller to select "0" to pause, select "1" to unpause, select "2" to repeat the instruction, select "3" to return to the main menu, and select "4" to receive detailed instructions. If the caller selects "0", the instruction set is paused (step s32) as will be discussed below. If the caller selects "1", the pause command is canceled (step s34). If the caller selects "2", the previous instruction is repeated (step s36). If the caller selects "3", the caller is returned to the main menu at step s4 (step s38). If the caller selects "4", detailed instructions are presented to the caller as will be discussed below (step s40). If no command is entered by the caller, processing continues at step s42.

At step s42, the caller is queried as to whether the task was completed (e.g., "Done yet?"). The prompt will be repeatedly presented to the caller at predetermined intervals (e.g., every 5 seconds) in a looping fashion, giving the caller sufficient time to perform the task. The repeated prompting serves to keep the caller focused on the particular task. It has been observed that persons performing tasks previously foreign to them are often times overwhelmed and may understandably exhibit anxiety, tentativeness, and confusion. Hence, keeping the caller focused is a key objective. Also, the repeated prompting serves as a reminder of what task to perform in a series of tasks, making certain that a step is not inadvertently omitted. The repeated prompting also includes and serves as a checklist, should the user become distracted during completion of a particular task.

If the "Done yet?" query is presented to the caller for a predetermined number of times (e.g., five times), it may be indication that the caller has encountered a problem. Therefore, in an alternative embodiment, the caller may be redirected to a service representative, for example, if the predetermined number of times condition is satisfied.

If the caller selects "1" at step s44 indicating the task was completed, call processing continues at a correct completion branch (i.e., task correct) as will be discussed below (step s46). If the caller selects "2" at step s44, the sub-instruction is repeated to the caller and the caller remains in a sub-instruction loop (step s48). If the caller selects "3" at step s44, the caller is transferred to the main menu at step s4 (step s50). If the caller selects "4" at step s44, the instruction set is backed up to the previous instruction (step s52). If the caller selects "5" at step s44, the call completion prompt loop continues and the "Done yet?" prompt is repeated (step s54). If the caller selects "6" at step s44, the call is transferred to a service representative, as will be discussed below (step s56).

Figure 3:
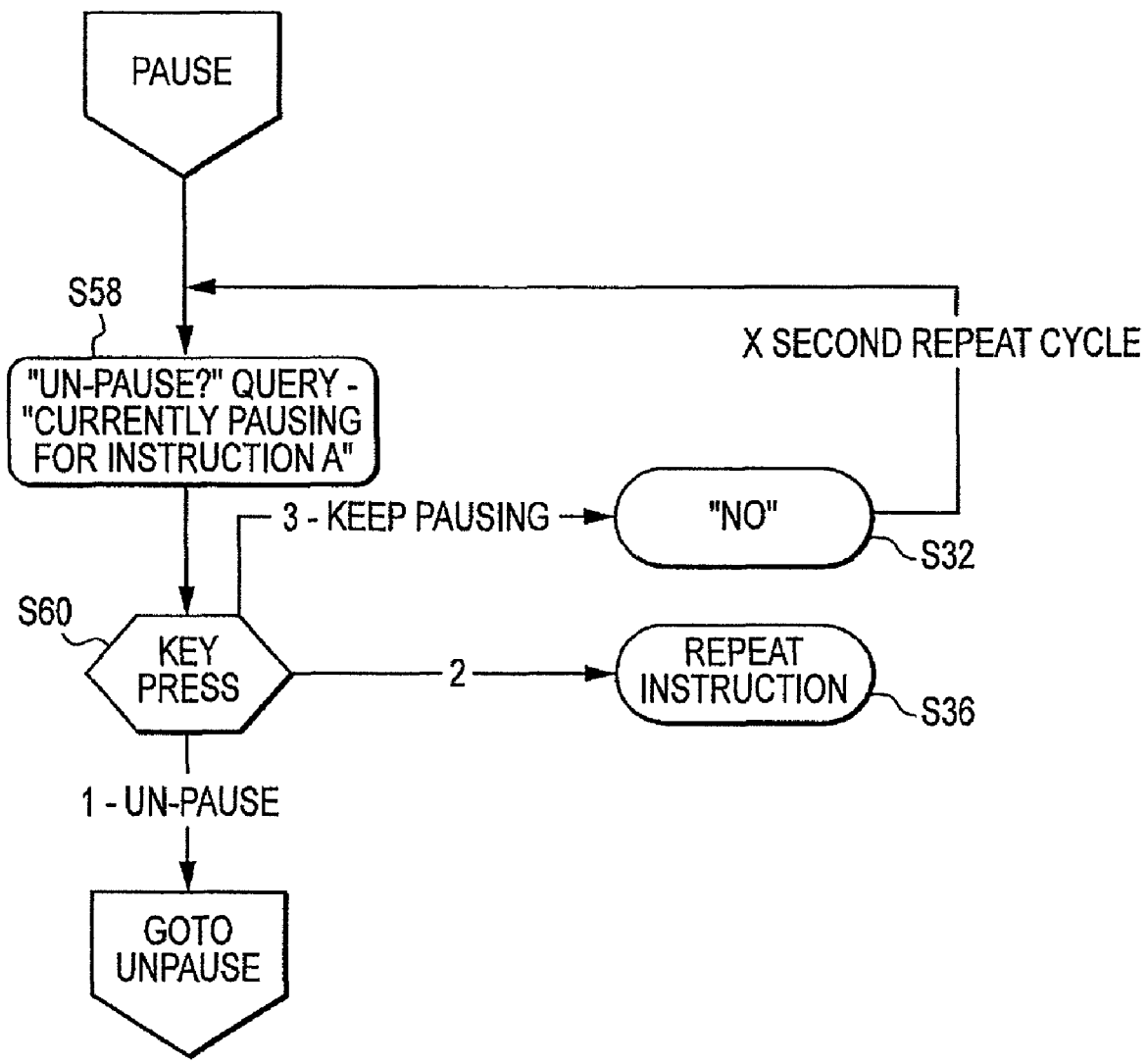
FIG. 3 is an exemplary flowchart diagram of pause branch call processing, according to an aspect of the present invention FIG. 4 an exemplary flowchart diagram of detailed instruction branch call processing, according to an aspect of the present invention.

Referring to an earlier point in FIG. 2, if the caller selects "0" at step s30, processing continues at a pause branch (step s32), as will be discussed with reference to FIG. 3. FIG. 3 is exemplary flowchart diagram of pause branch call processing. The system permits the user to manually pause the instruction set to accommodate unanticipated interruptions, collect one's composure, reflect on the procedure, etc. At step s58, the caller is presented with an un-pause query, asking the caller whether they would like to unpause the instruction set and advising the caller which sub-instruction has been paused. If the caller selects "1" at step s60, processing is un-paused and the caller returns to processing at FIG. 1 (step s30). If the caller selects "2" at step s60, the instruction is repeated (step s36). Complex instructions frequently require multiple presentations to be well understood by the user. This is particularly true with respect to inexperienced persons performing a series of tasks for the first time. As a result, the instructions of the present invention are divided up into smaller bits of information that are manageable, matching human memory capabilities. Notwithstanding this division of information, users may require instructions to be repeated, possibly multiple times. For instance, the caller may become distracted and not hear a task, or merely may not comprehend an exacting task.

If the caller selects "3" at step s60, the pause branch processing continues (step s32) and the caller is prompted at a predetermined intervals (e.g., every 5 seconds) as to whether they would like to unpause the system. As explained, the pause branch processing continues until the caller exits the loop by selecting "1" or "2".

Figure 4:
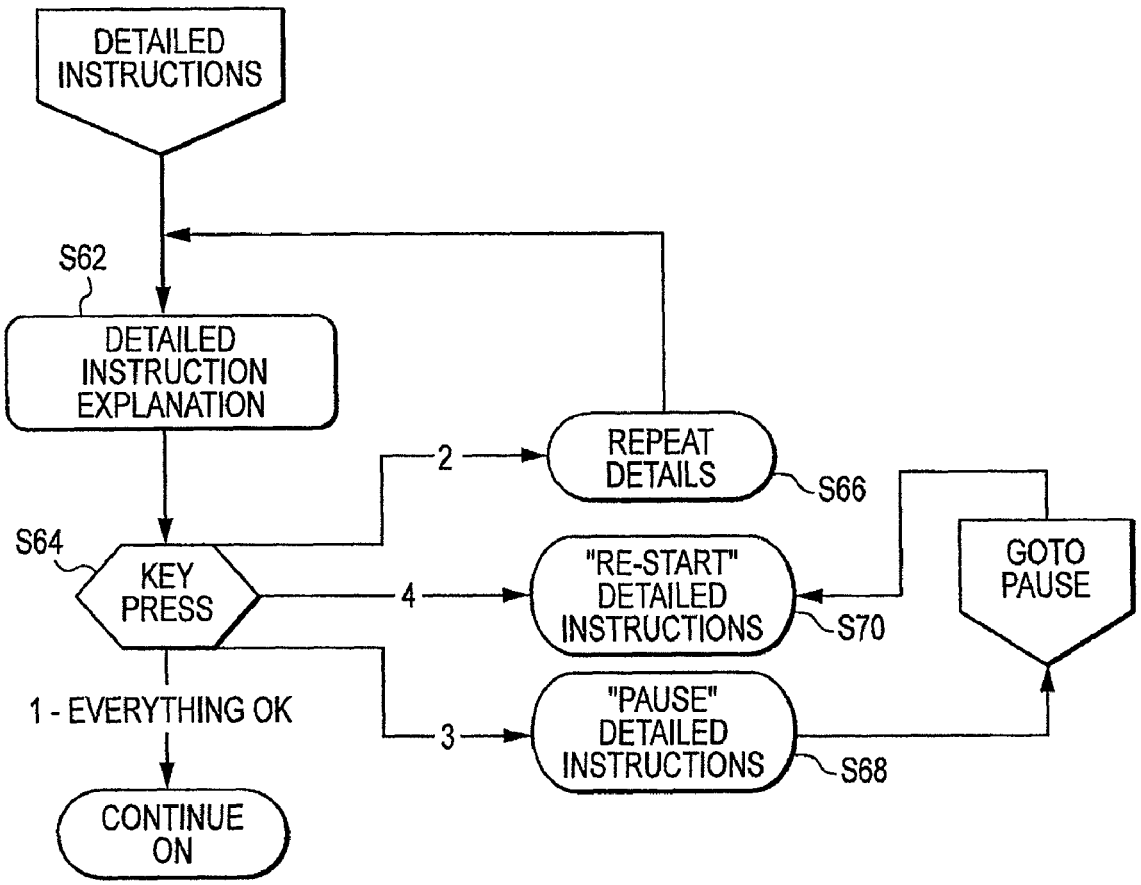

Referring to FIG. 2, if the caller selects "4" at step s30, processing continues at a detailed instructions branch, as will be discussed with respect to FIG. 4. FIG. 4 is exemplary flowchart diagram of detailed instruction branch call processing. As discussed, since the IVR system is designed for both novice and experience users, certain instructions may require elaboration. Accordingly, optional instructions are provided that present additional, detailed information regarding a particular task. For example, the prompt might recite "Press 1 when you are finished installing the software. If you need more detailed information instructions on how to install the software, press 2". If the user is experienced in software installation, the user could select "1" and continue with the next task in the sequential instruction set. Conversely, if the user was uncertain of how to install the software, they could select "2", at which point they would be directed to a sub-instruction set detailing the software installation process. In this case, when the sub-instruction process is complete, the user would return to the next sequential instruction. At step s62, detailed instructions associated with the sub-instruction are presented to the caller. At step s64, the caller is prompted to select "1", which will return the caller to step s30. If the caller selects "2" at step s64, the detailed instructions are repeated at step s62. If the caller selects "3" at step s64, the detailed instructions are paused (step s68) and the call flow continues at pause branch step s58. If the caller selects "4", the pause loop is interrupted, the detailed instructions are restarted (step s70), and the user is returned to step s62.

Figure 5:
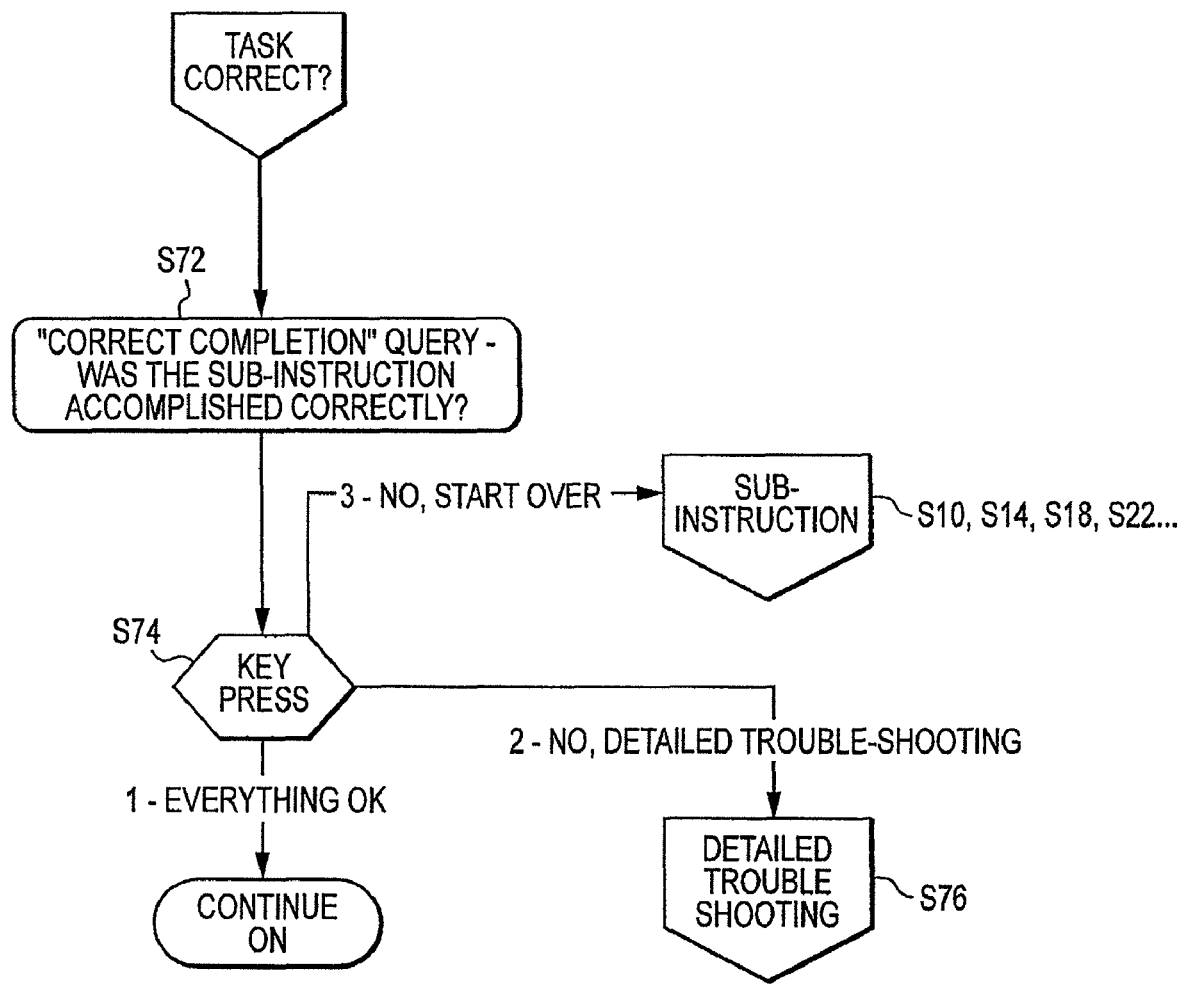
FIG. 5 is an exemplary flowchart diagram of task correct completion branch call processing, according to an aspect of the present invention.

Referring to FIG. 2, if the caller selects "1" at step s44, processing continues at a correct completion branch (step s46), as will be discussed with respect to FIG. 5. FIG. 5 is an exemplary flowchart diagram of correct completion branch call processing. The system does not assume that the user performed the instruction correctly. As a result, at step s72 the caller is prompted with a correct completion query, asking the caller whether the sub-instruction was completed correctly (e.g., "Was the sub-instruction accomplished correctly?"). At step s74, if the caller selects "1", call processing continues at step s44. If the caller selects "2", call processing is sent to a troubleshooting branch (step s76). The troubleshooting branch will prompt the caller to choose from a plurality of options in attempt to illicit the nature of the caller's problem. A solution instruction is presented to the caller, based upon the option selected. The caller will remain in a loop until the caller indicates that the problem is resolved, or the caller requests a transfer to a service representative. Once the caller's problem has been resolved, processing will continue with the next sequential instruction. If the caller selects "3", indicating that correct completion was not achieved, the sub-instruction (step s10, s14, s18, or s22) is repeated.

Rather than, or in addition to, querying the caller after each sub-instruction as to whether the task was performed correctly, the caller may be queried after the entire procedure is completed (e.g., "Was the procedure a success?"). In this case, if the caller selects "1", the system begins the exiting procedure and the call is disconnected. If the caller selects "2", call processing is sent to a troubleshooting branch. If the caller selects "3", the entire set of sub-instructions is re-started, so that the caller may trace all of the steps.

Figure 6:
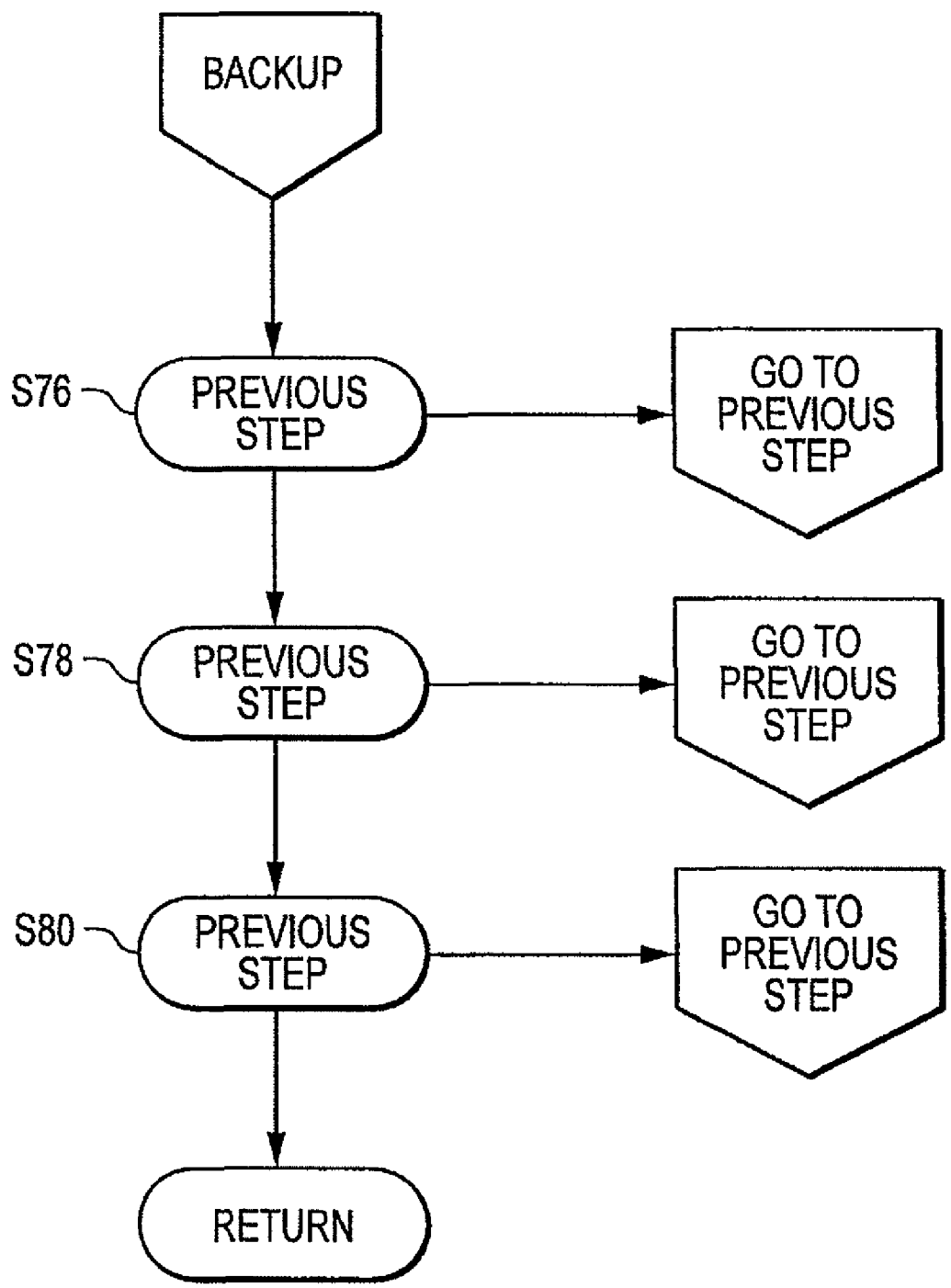
FIG. 6 is an exemplary flowchart diagram of backup branch call processing, according to an aspect of the present invention.

If the caller selects "4" at step s44, the call is backed up. FIG. 6 is an exemplary flowchart diagram of backup branch call processing. Frequently, a user does not realize that an error has been made in a previous step until the user reaches a subsequent step. This is especially the case when a long list of instructions is presented. With written instructions, the user may simply re-read the previous instructions. However, such is not the case with an IVR. Accordingly, the caller is permitted to sequentially move back up the instruction chain, with prompts informing the caller of where they are in the set of instructions. For example, when maneuvering backward, the system advises the user "This step tells you how to install a modem, the previous step tells you how to remove a computer case", etc. That is, at step s44, the user selected "4" to backup the menu. Accordingly, previously presented sub-instructions (steps s76, s78, s80, . . . ), or summaries thereof, begin playing to the user. The user may then go directly to a sub-instruction by, for example, selecting "#". Alternatively, a prompt may advise the caller "Now that the software is installed, reboot your computer. If you haven't installed the software yet, press "#" to go back to that step".

Figure 7:
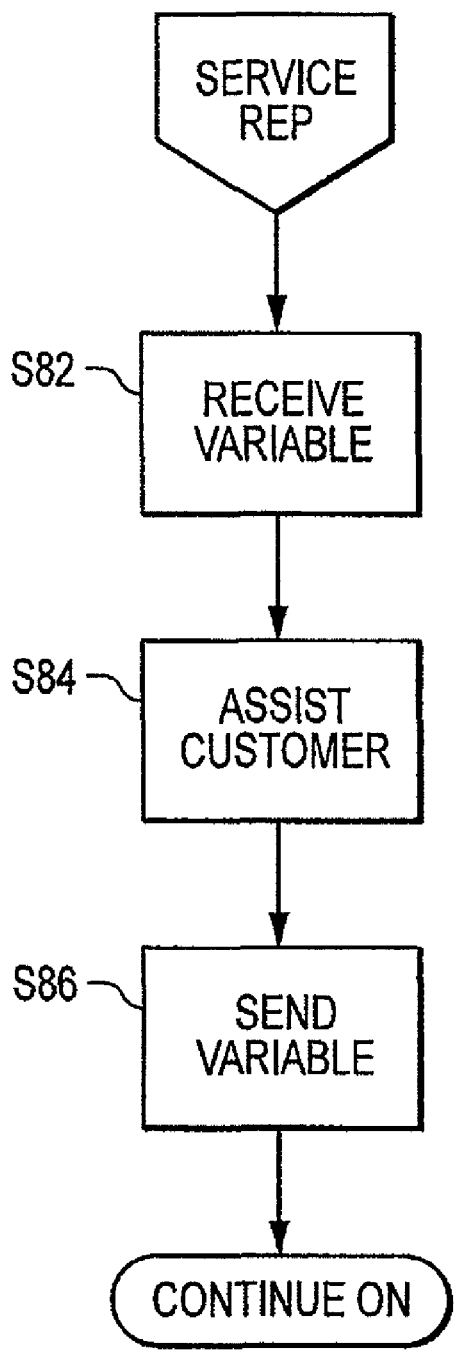
FIG. 7 is an exemplary flowchart diagram of service representative branch call processing, according to an aspect of the present invention.

If the caller selects "6" at step s44, the call is transferred to a service representative. FIG. 7 is an exemplary flowchart diagram of service representative branch processing. Sometimes, situations arise that are not covered in the instructions. As a result, a caller may select an option to transfer the call to a live service representative. When the caller selects this option, the system removes the caller from the IVR and transfers them to a service representative. In IVR systems having the capability, a variable representing the caller's location in the IVR instruction set is saved and sent to the service representative at step s82 when the call is transferred. For example, the variable may be populated with "3a", indicating that the caller was at step 3a in the instruction set before the transfer. As a result, the service representative can, for example, receive the caller's "state" information on a monitor via telephone, or other device. In capable systems, after assisting the caller at step s84, the service representative can transfer the caller back into the IVR at the place where the caller exited the IVR. In this case, the variable "3a" would be passed back to the IVR by the representative at step s86. Optionally, the service representative could send the caller back to the IVR at any place in the instruction flow, by sending a variable of choice, representing a step in the instruction set, to the IVR at step s86.

Figure 8:
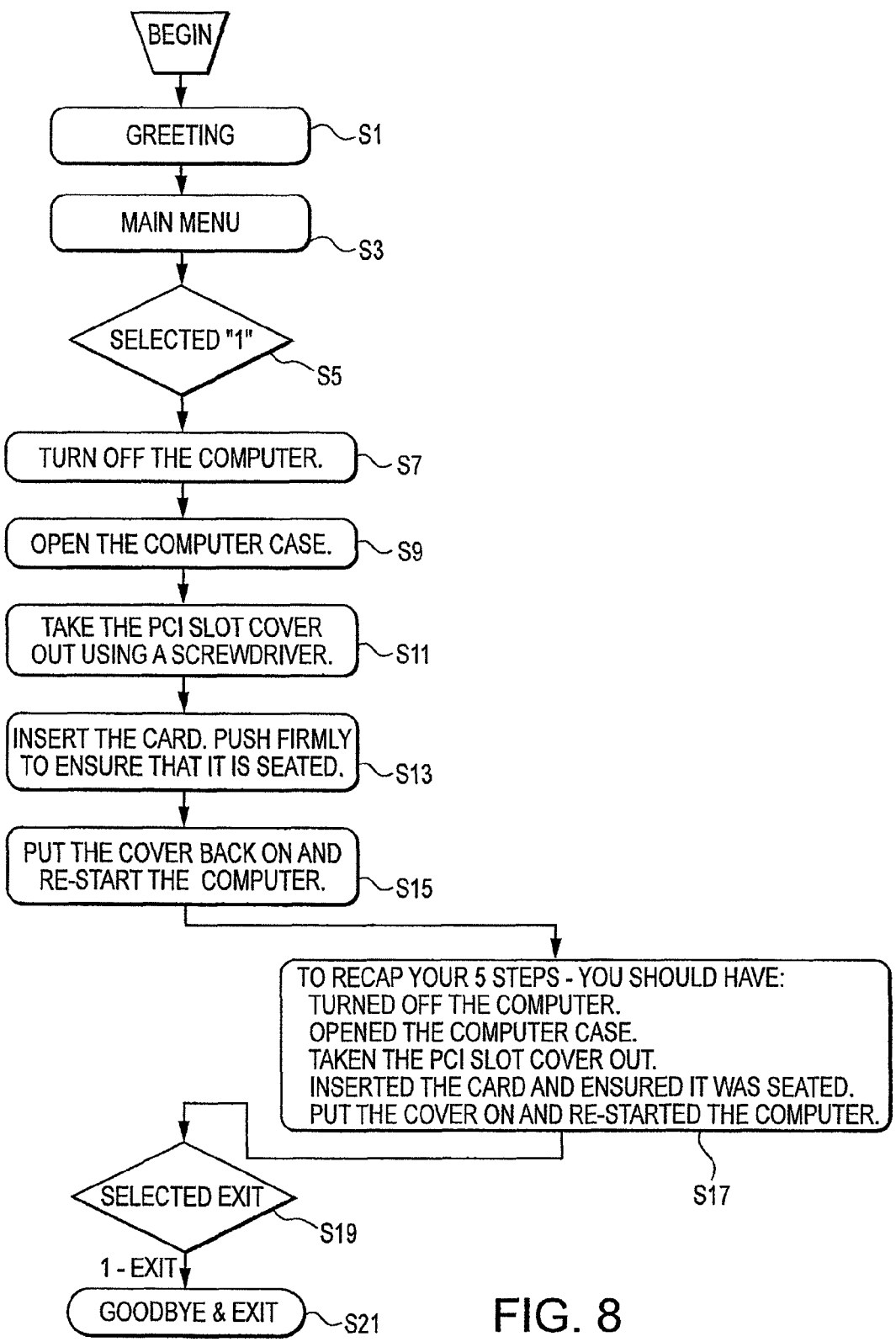
FIG. 8 is an exemplary flowchart diagram of a call, processed according to an aspect of the present invention.

FIG. 8 is an exemplary flowchart diagram of a call processed in the IVR system, according to an aspect of the present invention. A caller's call is received and a greeting is played to the caller at step s1. At step s3, a main menu is played to the caller. For example, the caller is presented with the following main menu options: "For installing a network card, press 1"; "For installing PPPoE software, press 2"; and For installing a USB modem, press 3". In this exemplary embodiment, the call flow will be discussed as if the caller elected to install a network card. However, it will be understood, that any of the choices made in the main menu will result in similar sub-instruction processing.

At step s5, the caller selects "1" from the main menu in order to receive instructions on installing a network card. At step s7, sub-instruction "a" is presented to the caller instructing the caller, i.e., "Turn off the computer". At step s9, sub-instruction "b" is presented to the caller, i.e., "Open the computer case". At step s11, sub-instruction "c" is presented to the caller, i.e., "Take the PCI slot cover out using a screwdriver". At step s13, sub-instruction "d" is presented to the caller, i.e., "Insert the card. Push firmly to ensure that it is seated". At step s15, sub-instruction "d" is presented to the caller, i.e., "Put the cover back on and re-start the computer". A step (not shown) may be provided giving the caller the option of receiving a recap of the instruction set. In FIG. 8, the caller automatically receives a recap of the instruction set. Accordingly, at step s17, a recap of the instruction set is presented to the caller. At step s19, the exiting process begins and the call is disconnected at step s23.

Figure 9:
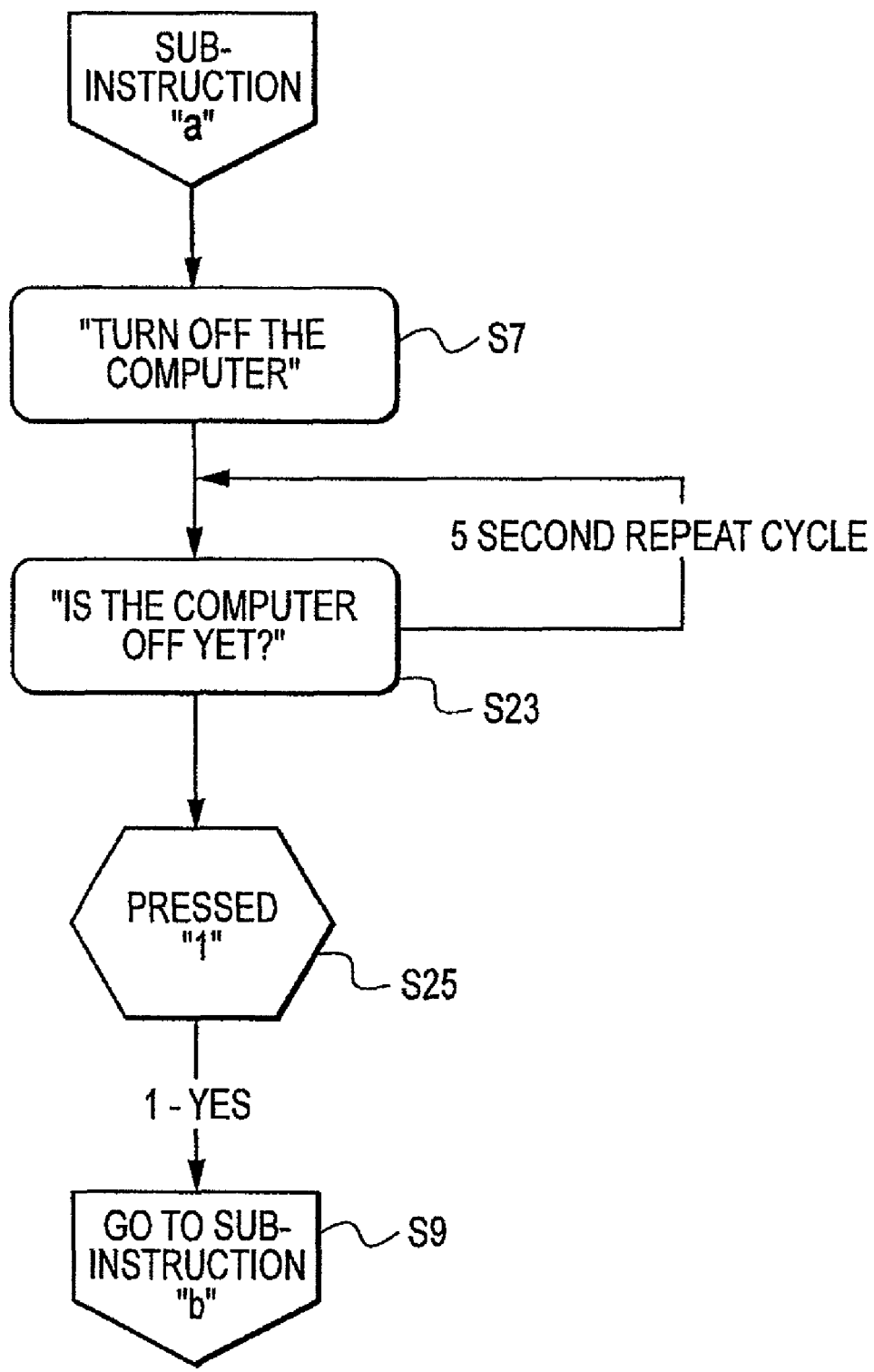
FIG. 9 is an exemplary flowchart diagram of a sub-instruction routine of a call, processed according to an aspect of the present invention.

FIG. 9 is an exemplary flowchart diagram of a sub-instruction routine of a call processed in the IVR system, according to an aspect of the present invention. At step s7, sub-instruction "a" is presented to the caller, i.e. "Turn off the computer". The IVR system recognizes that caller may take some time to complete the sub-instruction. As a result, the call flow continues in a loop until the caller indicates completion of the sub-instruction That is, the caller will be prompted periodically (e.g., every 5 seconds), as to whether the caller has completed the sub-instruction, i.e., "Is the computer off yet?" (step s23). If the caller selects "1" (step s25), indicating that the computer is turned off, processing continues at sub-instruction "b" (step s9). Otherwise, the loop continues and the caller is prompted once again at step s23.

Figure 10:
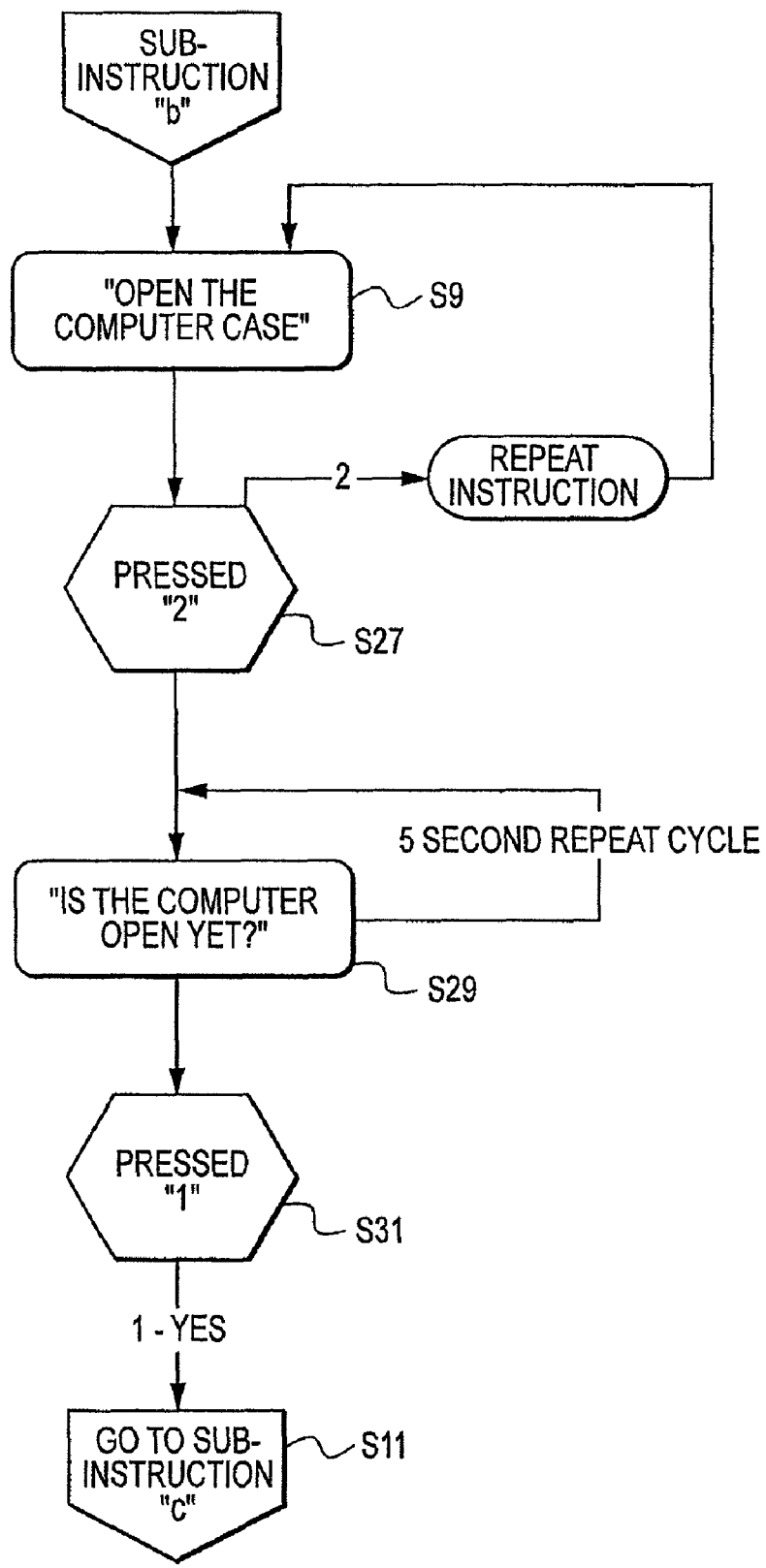
FIG. 10 is an exemplary flowchart diagram of another sub-instruction routine of a call, processed according to an aspect of the present invention.

FIG. 10 is an exemplary flowchart diagram of a sub-instruction routine of a call processed in the IVR system, according to an aspect of the present invention. At step s9, sub-instruction "b" is presented to the caller, i.e, "Open the computer case". After the sub-instruction is presented to the caller, the caller may select "2" in the sub-instruction sub-menu (step s27) to repeat sub-instruction "b". The IVR system recognizes that caller may take some time to complete the sub-instruction. As a result, the call flow continues in a loop until the caller indicates completion of the sub-instruction. For example, the caller will be prompted periodically (e.g., every 5 seconds), as to whether they have completed the sub-instruction, i.e., "Is the computer open yet?" (step s29). If the caller selects "1" (step s31) indicating that the computer is open, processing continues at sub-instruction "c" (step s11). Otherwise, the loop continues and the caller is prompted once again as to whether the computer is open (step s29).

Figure 11:
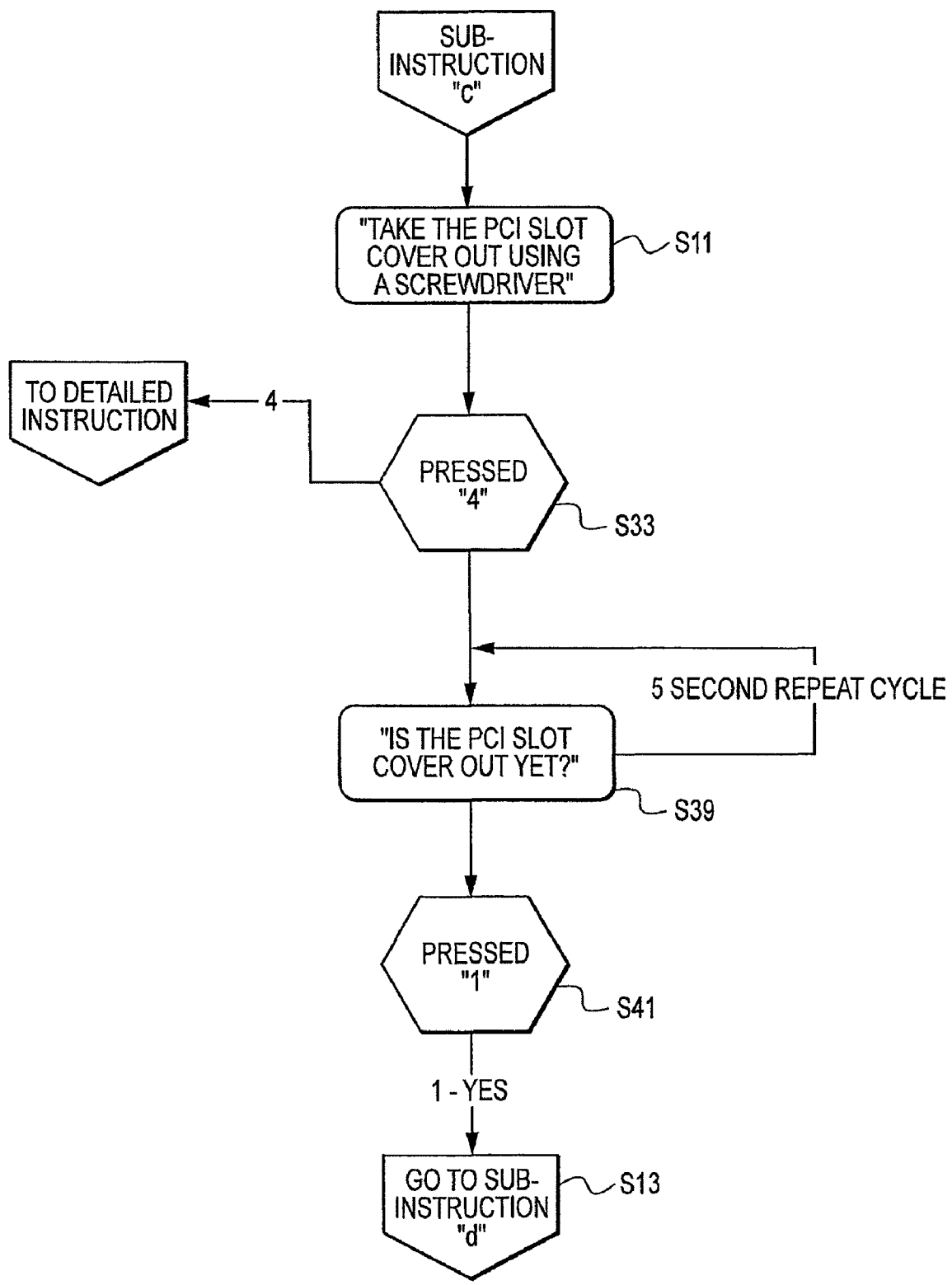
FIG. 11 is an exemplary flowchart diagram of another sub-instruction routine of a call, processed according to an aspect of the present invention.

FIG. 11 is an exemplary flowchart diagram of a sub-instruction routine of a call processed in the IVR system, according to an aspect of the present invention. At step s11, sub-instruction "c" is presented to the caller, i.e., "Take the PCI slot cover out using a screwdriver". After the sub-instruction was presented to the caller, the caller selects "4" in the sub-instruction sub-menu (step s33). As a result, the caller is presented with detailed instructions, as will be discussed with respect to FIG. 12.

Figure 12:
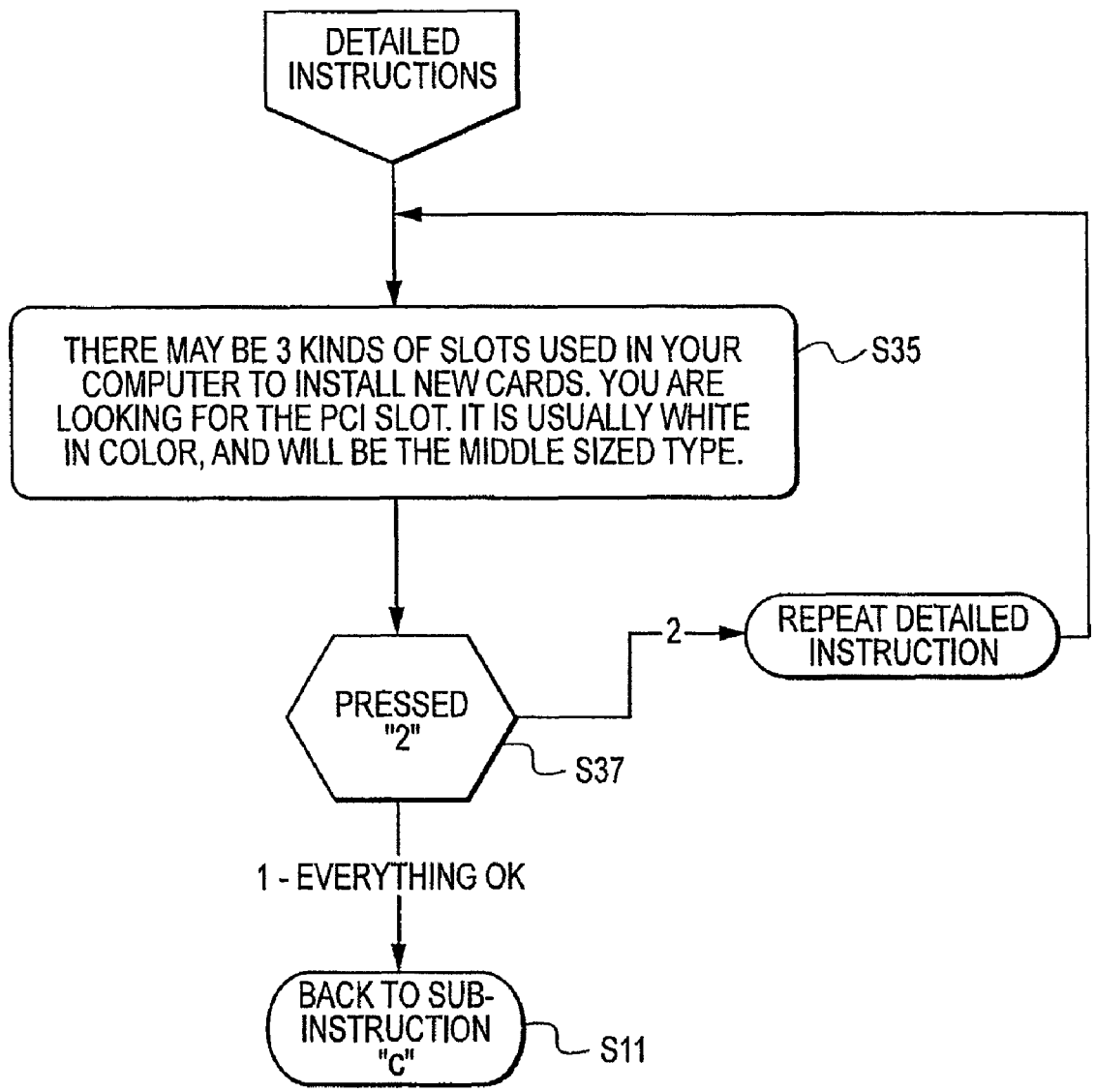
FIG. 12 is an exemplary flowchart diagram of a detailed instructions branch routine of a call, processed according to an aspect of the present invention.

FIG. 12 is an exemplary flowchart diagram of a detailed instructions sub-routine. At step s35, the caller is presented with detailed instructions regarding removal of a PCI slot. For example, the caller is presented with a prompt as follows: "There may be 3 kinds of slots used in your computer to install new cards. You are looking for the PCI slot. It is usually white in color, and will be the middle size type". After the announcement, the caller is prompted to select "1" to return to sub-instruction "c" (step s39) or select "2" to repeat the detailed instruction (step s37). Reference will now be made back to FIG. 11, indicating that the caller selected "1".

The IVR system recognizes that caller may take some time to complete the sub-instruction. As a result, the call flow continues in a loop until the caller indicates completion of the sub-instruction. Referring to FIG. 11, the caller will be prompted periodically (e.g., every 5 seconds), as to whether they have completed the sub-instruction, i.e., "Is the PCI slot cover out yet?" (step s39). If the caller selects "1" (step s41), processing continues at sub-instruction "d" (step s13). Otherwise, the loop continues and the caller is prompted once again at step s39.

Figure 13:
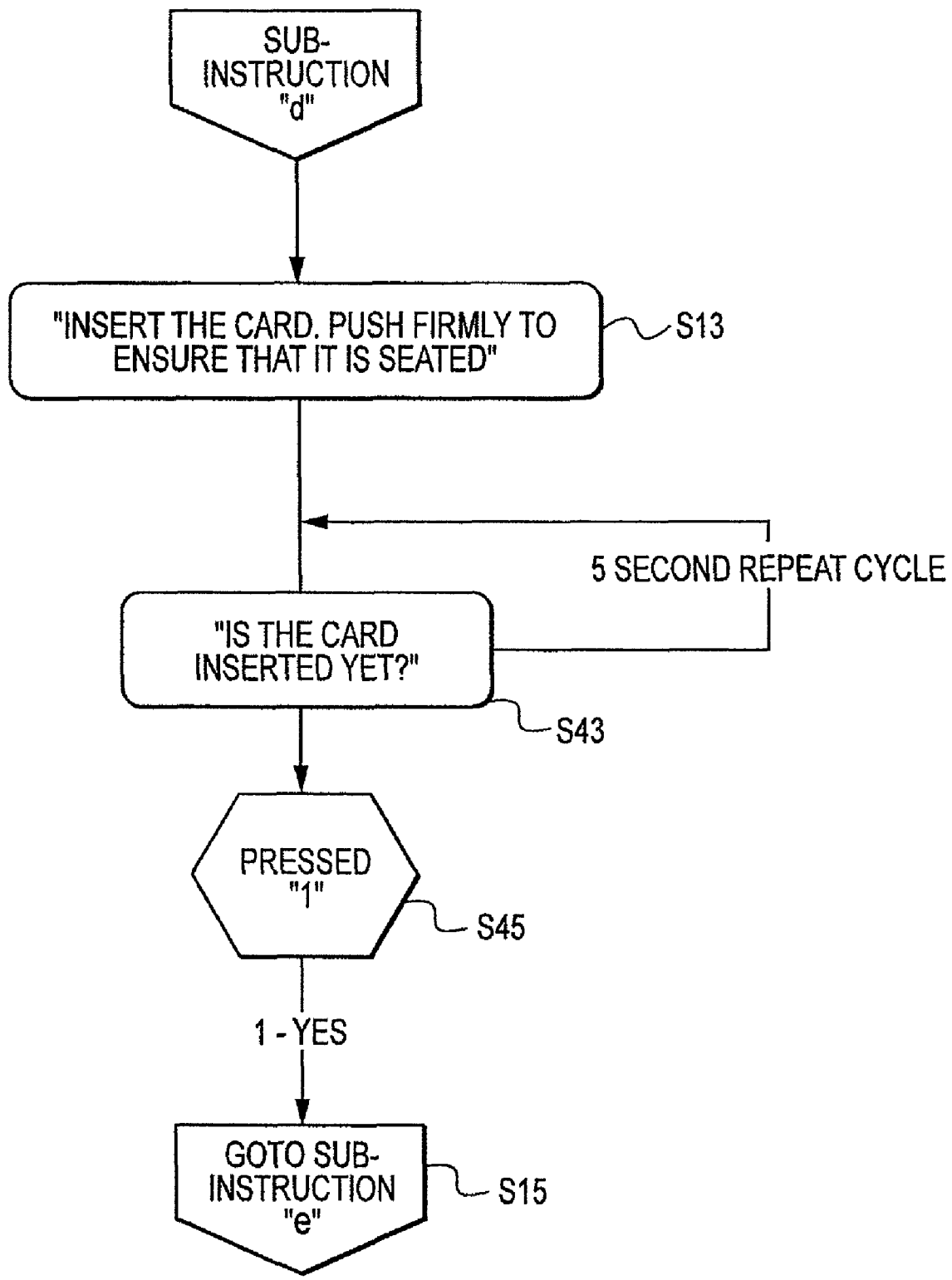
FIG. 13 is an exemplary flowchart diagram of another subinstruction routine of a call, processed according to an aspect of the present invention.

FIG. 13 is an exemplary flowchart diagram of a sub-instruction routine of a call processed in the IVR system, according to an aspect of the present invention. At step s13, sub-instruction d is presented to the caller, i.e., "Insert the card. Push firmly to ensure that it is seated". The IVR system recognizes that caller may take some time to complete the sub-instruction. As a result, the call flow continues in a loop until the caller indicates completion of the sub-instruction. Referring to FIG. 13, the caller will be prompted periodically (e.g., every 5 seconds), as to whether they have completed the sub-instruction, i.e., "Is the card inserted yet?" (step s43). If the caller selects "1" (step s45) indicating that the card is inserted, processing continues at sub-instruction "e" (step s15). Otherwise, the loop continues and the caller is prompted once again at step s43 as to whether the card has been inserted.

Figure 14:
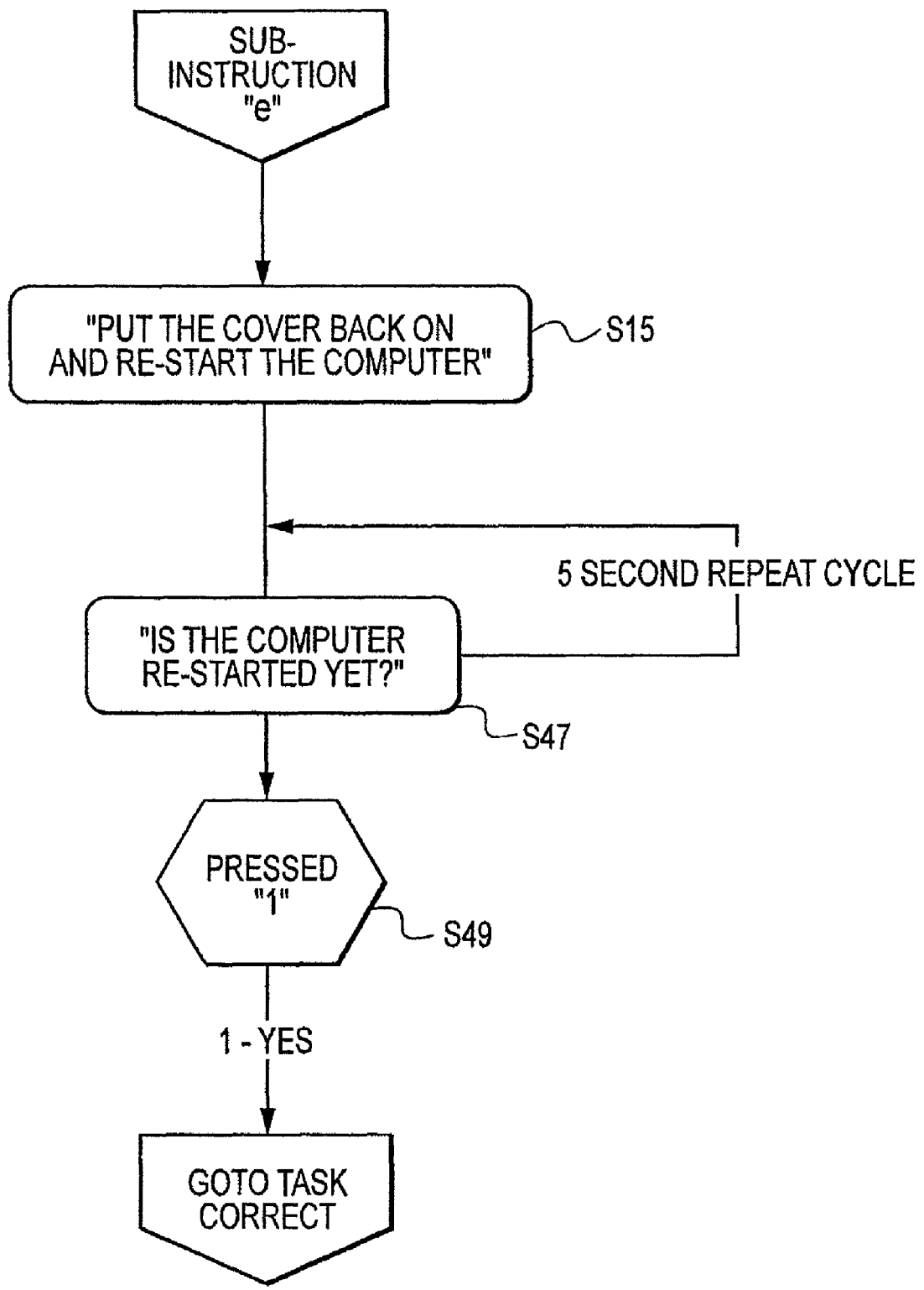
FIG. 14 is an exemplary flowchart diagram of another sub-instruction routine of a call, processed according to an aspect of the present invention.

FIG. 14 is an exemplary flowchart diagram of a sub-instruction routine of a call processed in the IVR system, according to an aspect of the present invention. At step s15, sub-instruction "e" was presented to the caller, i.e., "Put the cover back on and restart the computer". The IVR system recognizes that caller may take some time to complete the sub-instruction. As a result, the call flow continues in a loop until the caller indicates completion of the sub-instruction. Referring to FIG. 14, the caller will be prompted periodically (e.g., every 5 seconds), as to whether they have completed the sub-instruction, i.e., "Is the computer restarted yet?" (step s47). If the caller selects "1" (step s49) indicating that the computer has restarted, processing continues at task correct branch. Otherwise, the loop continues and the caller is prompted once again as to whether the computer has restarted (step s47).

Figure 15:
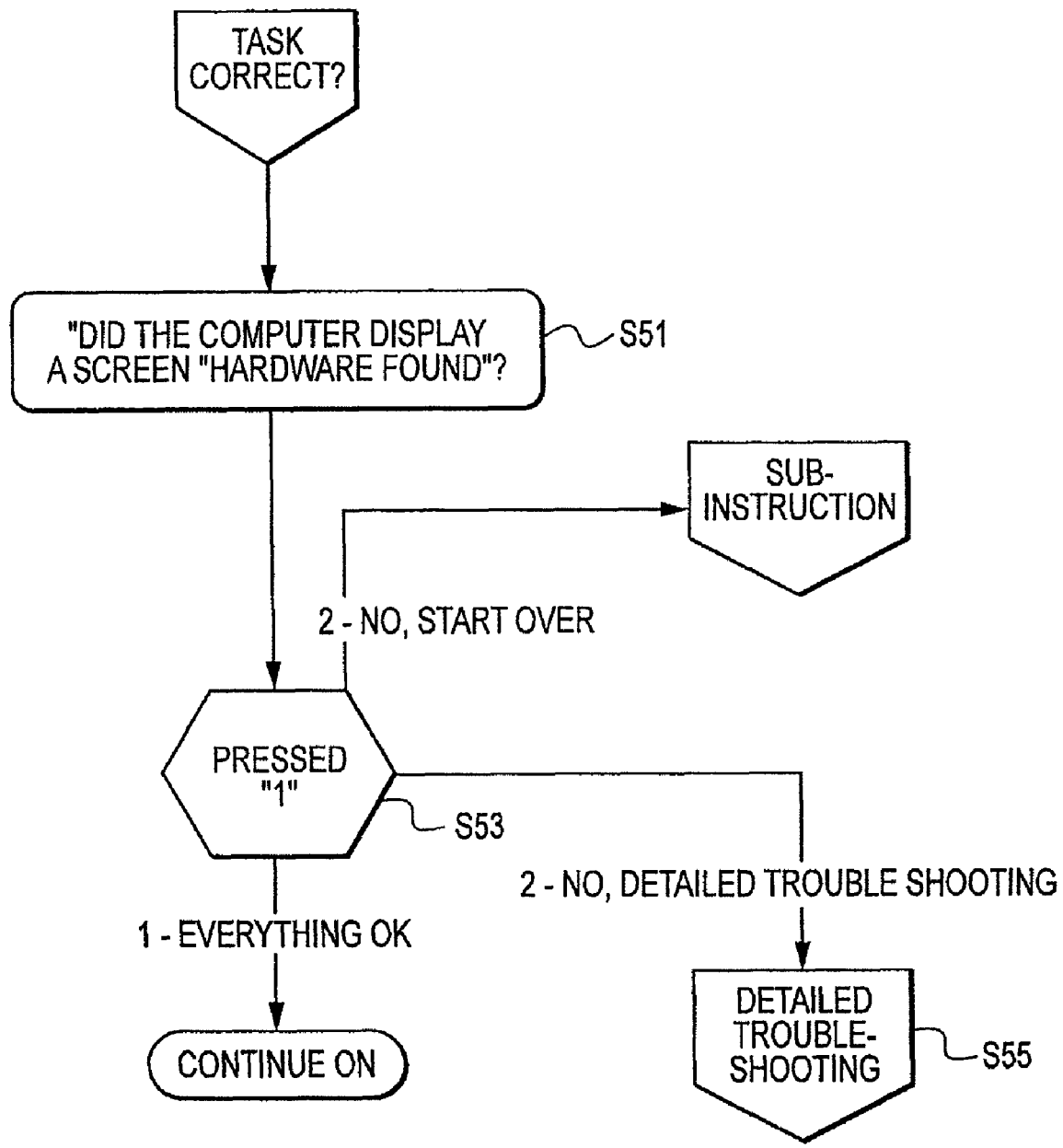
FIG. 15 is an exemplary flowchart diagram of a task correct routine of a call, processed according to an aspect of the present invention.

FIG. 15 is an exemplary is an exemplary flowchart diagram of a correct completion sub-instruction routine of a call processed in the IVR system, according to an aspect of the present invention. After the caller has performed each sub-instruction, the caller is prompted with a question formulated to ascertain whether the task was completed correctly (step s51). For instance, the caller may be prompted as follows: "Did the computer display a Hardware Found screen?" If the caller selects "1" at step s53, call processing continues with the next sub-instruction, if appropriate. If the caller selects "2", the caller is directed to a troubleshooting branch (step s55). If the caller selects "3", the instant sub-instruction is repeated. Alternatively, as discussed previously, the entire set of instructions may be repeated.

As shown, the present IVR system allows a caller to perform a series of sequential tasks based on an instruction set. The caller is queried after each instruction to ensure that the caller has successfully completed all of the steps for that instruction. Additionally, provision is made to automatically pause the instruction set and present reminders to the caller. Further the caller may elect to repeat instructions, back up the instruction set, receive additional details, transfer to a service representative, or receive summary information.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims. For instance, it should be understood that callers may select menu messages via any means including DTMF input or spoken word. Further, it is to be understood that the specific menu selections discussed herein (e.g., "press 1") are representational in nature and that any suitable selections may be employed.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards, including standards for the IVR system, represent examples of the state of the art. Such standards are periodically superseded by faster or more efficient equivalents having essentially the same functions. Accordingly, replacement standards and protocols having the same functions are considered equivalents.

What is claimed is:

1. A method of presenting instructions to a user during a communications session with a service center, in which an interactive response system interacts with the user, comprising:

presenting a sequence of instructions to the user that enable completion of a procedure, the sequence of instructions being presented to the user by the interactive response system;

automatically pausing the sequence of instructions after each instruction for a predetermined time so as to permit the user to perform a task identified in the instruction;

presenting a summary of the sequence of instructions to the user; and re-presenting a portion of the sequence of instructions to the user in response to an indication from the user to re-start the sequence of instructions at a specific location in the sequence of instructions.

2. The method according to claim 1, wherein each instruction identifies a step to be performed by the user that is distinct from interaction with the service center.

3. The method according to claim 2, further comprising:

pausing the sequence of instructions in response to an indication from the user to pause the sequence of instructions.

4. The method according to claim 2, further comprising:

querying the user after each instruction as to whether the user has performed the task identified in the instruction.

5. The method according to claim 2, further comprising:

presenting a reminder to the user regarding the step identified in at least one of the instructions.

6. The method according to claim 1, wherein the summary of the sequence of instructions is presented to the user before the sequence of instructions has been presented to the user.

7. The method according to claim 1, wherein the summary of the sequence of instructions is presented to the user after the sequence of instructions has been presented to the user.

8. The method according to claim 1, wherein the summary of the sequence of instructions is presented to the user in response to a request from the user.

9. A method of presenting instructions to a user during a communications session with a service center, in which an interactive response system interacts with the user, comprising:

presenting a sequence of instructions to the user that enable completion of a procedure, the sequence of instructions being presented to the user by the interactive response system;

automatically pausing the sequence of instructions after each instruction for a predetermined time so as to permit the user to perform a task identified in the instruction;

presenting a summary of the sequence of instructions to the user; and re-presenting a portion of the sequence of instructions in reverse order in response to an indication from the user to sequentially move backwards in the sequence of instructions.

10. The method according to claim 9, wherein each instruction identifies a step to be performed by the user that is distinct from interaction with the service center.

11. The method according to claim 10, further comprising: querying the user after each instruction as to whether the user has performed the task identified in the instruction.

12. The method according to claim 10, further comprising: restarting the entire sequence of instructions in response to a request from the user.

13. The method according to claim 10, further comprising: eliciting from the user an indication as to whether the task was performed correctly.

14. A method of presenting instructions to a user during a communications session with a service center, in which an interactive response system interacts with the user, comprising:
presenting a sequence of instructions to the user that enable completion of a procedure, the sequence of instructions being presented to the user by the interactive response system;
automatically pausing the sequence of instructions after each instruction for a predetermined time so as to permit the user to perform a task identified in the instruction;
presenting a summary of the sequence of instructions to the user; and
returning to a previously presented instruction based upon input by the user.

15. The method according to claim 14, wherein each instruction identifies a step to be performed by the user that is distinct from interaction with the service center.

16. The method according to claim 15, the returning further comprising sequentially reversing the sequence of instructions and providing a prompt at each instruction in the reversed sequence of instructions, wherein input by the user in response to one of the prompts causes the instruction associated with the prompt to be played to the user.

17. The method according to claim 15, further comprising: pausing the sequence of instructions is response to an indication from the user to pause the sequence of instructions.

18. The method according to claim 15, further comprising: wherein the summary of the sequence of instructions is presented to the user before the sequence of instructions has been presented to the user.

19. The method according to claim 15, further comprising: wherein the summary of the sequence of instructions is presented to the user after the sequence of instructions has been presented to the user.

20. The method according to claim 15, further comprising: wherein the summary of the sequence of instructions is presented to the user in response to a request from the user.

* * * * *